United States Patent
Wei et al.

(10) Patent No.: US 12,289,774 B2
(45) Date of Patent: Apr. 29, 2025

(54) ASSOCIATION OF SYNCHRONIZATION SIGNAL BLOCKS TO RANDOM ACCESS OCCASIONS

(71) Applicant: Qualcomm Incorporated, San Diego, CA (US)

(72) Inventors: Chao Wei, Beijing (CN); Qiaoyu Li, Beijing (CN); Hao Xu, Beijing (CN); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 588 days.

(21) Appl. No.: 17/634,618

(22) PCT Filed: Aug. 11, 2020

(86) PCT No.: PCT/CN2020/108334
§ 371 (c)(1),
(2) Date: Feb. 11, 2022

(87) PCT Pub. No.: WO2021/027798
PCT Pub. Date: Feb. 18, 2021

(65) Prior Publication Data
US 2022/0330348 A1    Oct. 13, 2022

(30) Foreign Application Priority Data
Aug. 12, 2019  (WO) ................ PCT/CN2019/100140

(51) Int. Cl.
*H04W 74/0833*   (2024.01)
*H04W 56/00*     (2009.01)
(Continued)

(52) U.S. Cl.
CPC ..... *H04W 74/0841* (2013.01); *H04W 56/001* (2013.01); *H04W 72/0446* (2013.01); *H04W 72/1263* (2013.01); *H04W 74/0866* (2013.01)

(58) Field of Classification Search
CPC ........... H04W 74/0841; H04W 56/001; H04W 72/0446; H04W 72/1263; H04W 74/0866
See application file for complete search history.

(56) References Cited

U.S. PATENT DOCUMENTS

2019/0132882 A1    5/2019  Li et al.
2019/0306892 A1*  10/2019  Xiong ................... H04W 88/02
(Continued)

FOREIGN PATENT DOCUMENTS

CN    108809602 A    11/2018
CN    109729580 A     5/2019
(Continued)

OTHER PUBLICATIONS

Ericsson: "Remaining Details on RACH Procedure", 3GPP Draft, 3GPP TSG RAN WG1 Meeting #91, R1-1720941_Remaining Details on RACH Procedure, 3rd Generation Partnership Project (3GPP), Mobile Competence Centre, 650, Route Des Lucioles, F-06921 Sophia-Antipolis Cedex, France, vol. RAN WG1, No. Reno, Nevada, US, Nov. 27, 2017-Dec. 1, 2017, Nov. 18, 2017, XP051370315, 24 pages, Retrieved from the Internet: URL: http://www.3gpp.org/ftp/tsg%5Fran/WG1%5FRL1/TSGR1%5F91/Docs/, [retrieved on Nov. 18, 2017], Section 3.2.

(Continued)

Primary Examiner — Yemane Mesfin
Assistant Examiner — Salma Ayad
(74) Attorney, Agent, or Firm — Holland & Hart LLP

(57) ABSTRACT

Methods, systems, and devices for wireless communications are described. Generally, the described techniques provide for a user equipment (UE) receiving, from a base station, one or more random access channel (RACH) configurations. The RACH configurations may allocate resources for a contention-based RACH procedure for accessing a wireless network. Based on the RACH configurations, the UE may (Continued)

determine a set of random access occasions for an association period. From the set of random access occasions, the UE may map one or more indices of a plurality of synchronization signal blocks to one or more random access occasions. Using the one or more random access occasions, the UE may transmit a random access sequence, including one or more repetitions of the random access sequence to the base station to access the wireless network.

30 Claims, 19 Drawing Sheets

(51) Int. Cl.
*H04W 72/0446* (2023.01)
*H04W 72/1263* (2023.01)
*H04W 74/08* (2024.01)

(56) References Cited

U.S. PATENT DOCUMENTS

| | | | | |
|---|---|---|---|---|
| 2020/0059878 A1* | 2/2020 | Huang | | H04B 7/088 |
| 2020/0068616 A1* | 2/2020 | Qian | | H04W 36/08 |
| 2020/0154377 A1 | 5/2020 | Qian et al. | | |
| 2020/0229242 A1* | 7/2020 | Xiong | | H04W 74/002 |
| 2020/0344810 A1* | 10/2020 | Xiong | | H04W 74/0833 |
| 2021/0014902 A1* | 1/2021 | Guo | | H04L 5/0091 |
| 2022/0104274 A1* | 3/2022 | Xu | | H04L 5/0069 |

FOREIGN PATENT DOCUMENTS

| | | |
|---|---|---|
| EP | 3621273 A1 | 3/2020 |
| WO | WO-2018182385 A1 | 10/2018 |
| WO | WO-2018203724 A1 | 11/2018 |
| WO | WO-2019099443 A1 | 5/2019 |
| WO | WO-2019100254 A1 | 5/2019 |
| WO | WO-2019137534 A1 | 7/2019 |
| WO | WO-2019139407 A1 | 7/2019 |

OTHER PUBLICATIONS

International Search Report and Written Opinion—PCT/CN2020/108334—ISA/EPO—Oct. 28, 2020.
International Search Report and Written Opinion—PCT/CN2019/100140—ISA/EPO—May 14, 2020.
Qualcomm: "Summary of Remaining Details on RACH Procedure", R1-1719160, 3GPP TSG RAN WG1 Meeting 90bis, Prague, CZ, Oct. 9-13, 2017, 24 Pages, Sections 2-6.
Supplementary European Search Report—EP20852737—Search Authority—The Hague —Aug. 11, 2023.

* cited by examiner

ASSOCIATION OF SYNCHRONIZATION SIGNAL BLOCKS TO RANDOM ACCESS OCCASIONS

CROSS REFERENCE TO RELATED APPLICATIONS

The present Application is a 371 national stage filing of International PCT Application No. PCT/CN2020/108334 by Wei et al., entitled "ASSOCIATION OF SYNCHRONIZATION SIGNAL BLOCKS TO RANDOM ACCESS OCCASIONS," filed Aug. 11, 2020; and claims priority to International PCT Application No. PCT/CN2019/100140 by Wei et al., entitled "ASSOCIATION OF SYNCHRONIZATION SIGNAL BLOCKS TO RANDOM ACCESS OCCASIONS," filed Aug. 12, 2019, each of which is assigned to the assignee hereof, and each of which is expressly incorporated by reference in its entirety herein.

FIELD OF TECHNOLOGY

The following relates generally to wireless communications, and more specifically to association of synchronization signal blocks (SSBs) to random access occasions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code-division multiple access (CDMA), time-division multiple access (TDMA), frequency-division multiple access (FDMA), orthogonal frequency-division multiple access (OFDMA), or discrete Fourier transform spread orthogonal frequency-division-multiplexing (DFT-s-OFDM). A wireless multiple-access communications system may include a number of base stations or network access nodes, each simultaneously supporting communication for multiple communication devices, which may be otherwise known as user equipment (UE).

In some cases, a UE may perform a random access procedure during initial access to establish a connection via a channel. The UE may receive synchronization signals and system information from a base station and identify one or more random access occasions based on the synchronization signals and the system information. The UE may then transmit one or more random access transmissions to the base station using one or more of the random access occasions. Conventional techniques for identifying the random access occasions and performing the random access procedure may have limitations for different types of devices including devices employing coverage enhancement or reduced channel width.

SUMMARY

The described techniques relate to improved methods, systems, devices, and apparatuses that support association of synchronization signal blocks (SSBs) to random access occasions. Generally, the described techniques provide for a user equipment (UE) receiving, from a base station, one or more random access channel (RACH) configurations (e.g., a first RACH configuration and a second RACH configuration), where the RACH configurations may allocate resources for the UE to transmit RACH transmissions to perform a contention-based RACH procedure to access a wireless network.

In some cases, such as for contention-based random access procedures, each of the RACH configurations may configure an association between one or more SSBs in a set of SSBs (e.g., an SSB burst set) and corresponding sets or subsets of RACH resources for RACH opportunities (e.g., assigning resources for corresponding RACH preambles). In such cases, the base station may indicate to its respective UEs, in the RACH configuration, a set of parameters including, for example, a number of transmitted SSBs, a number of SSBs mapped per RACH occasion, a number of contention-based RACH preambles per SSB for one or more RACH occasions, one or more configuration periods, and other like information. SSBs may be mapped to the RACH occasions according to an order (e.g., configured or predetermined), which may be based on one or more preamble indices within a single RACH occasion, frequency-division or time-division multiplexing of RACH occasions, or a number of RACH slots within the RACH occasions. For example, the mapping may be in an increasing order of preamble indices within a single RACH occasion, in increasing order of frequency-division multiplexed RACH occasions, in increasing order of time-division multiplexed RACH occasions within a slot, in increasing order of the number of RACH slots, or combinations of these mapping orders.

Based on the RACH configurations, the UE may determine a first set of random access occasions from the random access opportunities indicated in the RACH configurations. The UE may map one or more indices of the set of SSBs to one or more random access occasions of the first set of random access occasions within the association period. That is, from a mapping of one or more indices of the set of SSBs to the first set of random access occasions, the UE may determine one or more random access occasions associated with the SSB for an association period. In some examples, different SSBs may correspond to different spatial resources, such as different directional downlink transmit and uplink receive beams. The association period may be, for example, an integer number of a maximum value for one or more configuration periods, as defined by the RACH configurations. For example, the UE may sequentially map the SSBs to these sets of resources corresponding to RACH occasions. Using one or more random access occasions (e.g., a first subset of random access occasions) associated with the SSBs for the association period, the UE may transmit a random access sequence, including one or more repetitions, to gain access to the wireless network.

A method of wireless communication at a UE is described. The method may include receiving, from a base station, a first random access configuration and a second random access configuration (e.g., first and second RACH configurations), receiving a SSB of a set of SSBs transmitted by the base station, determining a first set of random access occasions within an association period based on the first random access configuration and the second random access configuration, mapping one or more indices of the set of SSBs to one or more random access occasions of the first set of random access occasions within the association period, and transmitting, to the base station, a random access sequence and one or more repetitions of the random access sequence using the one or more random access occasions associated with the SSB for the association period.

An apparatus for wireless communication at a UE is described. The apparatus may include a processor, memory coupled with the processor, and instructions stored in the memory. The instructions may be executable by the processor to cause the apparatus to receive, from a base station, a first random access configuration and a second random access configuration, receive a SSB of a set of SSBs transmitted by the base station, determine a first set of random access occasions within an association period based on the first random access configuration and the second random access configuration, map one or more indices of the set of SSBs to one or more random access occasions of the first set of random access occasions within the association period, and transmit, to the base station, a random access sequence and one or more repetitions of the random access sequence using the one or more random access occasions associated with the SSB for the association period.

Another apparatus for wireless communication at a UE is described. The apparatus may include means for receiving, from a base station, a first random access configuration and a second random access configuration, receiving a SSB of a set of SSBs transmitted by the base station, means for determining a first set of random access occasions within an association period based on the first random access configuration and the second random access configuration, means for mapping one or more indices of the set of SSBs to one or more random access occasions of the first set of random access occasions within the association period, and means for transmitting, to the base station, a random access sequence and one or more repetitions of the random access sequence using the one or more random access occasions associated with the SSB for the association period.

A non-transitory computer-readable medium storing code for wireless communication at a UE is described. The code may include instructions executable by a processor to receive, from a base station, a first random access configuration and a second random access configuration, receive a SSB of a set of SSBs transmitted by the base station, determine a first set of random access occasions within an association period based on the first random access configuration and the second random access configuration, map one or more indices of the set of SSBs to one or more random access occasions of the first set of random access occasions within the association period, and transmit, to the base station, a random access sequence and one or more repetitions of the random access sequence using the one or more random access occasions associated with the SSB for the association period.

Some examples of the method, apparatuses, and non-transitory computer-readable medium described herein may further include operations, features, means, or instructions for identifying a time-domain offset for a first set of random access opportunities relative to a second set of random access opportunities within the association period, where the second set of random access opportunities may be associated with a random access configuration index of the first random access configuration or the second random access configuration, or both, and where determining the first set of random access occasions includes mapping indices of the set of SSBs to the first set of random access opportunities. In some examples of the method, apparatuses, and non-transitory computer-readable medium described herein, the first set of random access occasions may be time-division multiplexed with the second set of random access occasions over different sets of nonoverlapping time-domain resources.

In some examples of the method, apparatuses, and non-transitory computer-readable medium described herein, the first random access configuration indicates a first configuration period and a first set of random access opportunities for the first configuration period, and the second random access configuration indicates a second configuration period and a second set of random access opportunities for the second configuration period.

In some examples of the method, apparatuses, and non-transitory computer-readable medium described herein, determining the first set of random access occasions may include operations, features, means, or instructions for determining the association period based on mapping an integer multiple of the set of SSBs to the first set of random access opportunities and the second set of random access opportunities. In some examples of the method, apparatuses, and non-transitory computer-readable medium described herein, the association period may be based on an integer number of a maximum value for the first configuration period or the second configuration period.

Some examples of the method, apparatuses, and non-transitory computer-readable medium described herein may further include operations, features, means, or instructions for mapping the one or more indices includes sequentially mapping indices of the set of SSBs to the first set of random access opportunities and the second set of random access opportunities. Some examples of the method, apparatuses, and non-transitory computer-readable medium described herein may further include operations, features, means, or instructions for mapping the one or more indices includes independently mapping indices of the set of SSBs to the first set of random access opportunities and the second set of random access opportunities. In some examples of the method, apparatuses, and non-transitory computer-readable medium described herein, mapping the one or more indices may include operations, features, means, or instructions for mapping an integer multiple of the set of SSBs to the first set of random access opportunities and the second set of random access opportunities. In some examples of the method, apparatuses, and non-transitory computer-readable medium described herein, each of the set of SSBs may be associated with a different directional beam transmitted by the base station.

A method of wireless communication at a base station is described. The method may include transmitting, to a first UE associated with a first protocol type, a first random access configuration and a second random access configuration, transmitting a set of SSBs, mapping one or more indices of the set of SSBs to a first set of random access occasions of a first association period, where the first set of random access occasions is based at least in part on the first random access configuration and the second random access configuration, and receiving, from the first UE, a first random access sequence and one or more repetitions of the first random access sequence associated with a first SSB of the set of SSBs over one or more random access occasions of the first association period.

An apparatus for wireless communication at a base station is described. The apparatus may include a processor, memory coupled with the processor, and instructions stored in the memory. The instructions may be executable by the processor to cause the apparatus to transmit, to a first UE associated with a first protocol type, a first random access configuration and a second random access configuration, transmit a set of SSBs, map one or more indices of the set of SSBs to a first set of random access occasions of a first association period, where the first set of random access occasions is based at least in part on the first random access configuration and the second random access configuration, and receive, from the first UE, a first random access sequence and one or more repetitions of the first random access sequence associated with a first SSB of the set of SSBs over one or more random access occasions of the first association period.

Another apparatus for wireless communication at a base station is described. The apparatus may include means for transmitting, to a first UE associated with a first protocol type, a first random access configuration and a second random access configuration, means for transmitting a set of SSBs, means for mapping one or more indices of the set of SSBs to a first set of random access occasions of a first association period, where the first set of random access occasions is based at least in part on the first random access configuration and the second random access configuration, and means for receiving, from the first UE, a first random access sequence and one or more repetitions of the first random access sequence associated with a first SSB of the set of SSBs over one or more random access occasions of the first association period.

A non-transitory computer-readable medium storing code for wireless communication at a base station is described. The code may include instructions executable by a processor to transmit, to a first UE associated with a first protocol type, a first random access configuration and a second random access configuration, transmit a set of SSBs, map one or more indices of the set of SSBs to a first set of random access occasions of a first association period, where the first set of random access occasions is based at least in part on the first random access configuration and the second random access configuration, and receive, from the first UE, a first random access sequence and one or more repetitions of the first random access sequence associated with a first SSB of the set of SSBs over one or more random access occasions of the first association period.

Some examples of the method, apparatuses, and non-transitory computer-readable medium described herein may further include operations, features, means, or instructions for transmitting, to a second UE associated with a second protocol type, a third random access configuration, and receiving, from the second UE, a second random access sequence associated with the first SSB over a random access occasion of a second set of random access occasions of a second association period, where the second set of random access occasions may be based on the third random access configuration. In some examples of the method, apparatuses, and non-transitory computer-readable medium described herein, at least one random access occasion of the second set of random access occasions may overlap in the time-domain with the first set of random access occasions. In some examples of the method, apparatuses, and non-transitory computer-readable medium described herein, the one or more random access occasions of the first set of random access occasions may be frequency-division multiplexed with the random access occasion of the second set of random access occasions.

Some examples of the method, apparatuses, and non-transitory computer-readable medium described herein may further include operations, features, means, or instructions for identifying a time-domain offset for a first set of random access opportunities relative to a second set of random access opportunities within the first association period, where the first set of random access opportunities may be associated with the first protocol type and the second set of random access opportunities may be associated with a second protocol type, mapping indices of the set of SSBs to the first set of random access opportunities associated with the first protocol type, and mapping indices of the set of SSBs to the second set of random access opportunities associated with the second protocol type.

In some examples of the method, apparatuses, and non-transitory computer-readable medium described herein, the first random access configuration may indicate a first configuration period and a first set of random access opportunities for the first configuration period, and the second random access configuration may indicate a second configuration period and a second set of random access opportunities for the second configuration period. In some examples of the method, apparatuses, and non-transitory computer-readable medium described herein, the first set of random access opportunities may be time-division multiplexed with the second set of random access opportunities over different sets of nonoverlapping time-domain resources.

Some examples of the method, apparatuses, and non-transitory computer-readable medium described herein may further include operations, features, means, or instructions for mapping the one or more indices of the set of SSBs to the first set of random access opportunities and the second set of random access opportunities. Some examples of the method, apparatuses, and non-transitory computer-readable medium described herein may further include operations, features, means, or instructions for determining the first association period based on mapping an integer multiple of the set of SSBs to the first set of random access opportunities and the second set of random access opportunities. In some examples of the method, apparatuses, and non-transitory computer-readable medium described herein, the first association period may be based on an integer number of a maximum value for the first configuration period or the second configuration period.

Some examples of the method, apparatuses, and non-transitory computer-readable medium described herein may further include operations, features, means, or instructions for mapping the one or more indices includes sequentially mapping indices of the set of SSBs to the first set of random access opportunities and the second set of random access opportunities. Some examples of the method, apparatuses, and non-transitory computer-readable medium described herein may further include operations, features, means, or instructions for mapping the one or more indices includes independently mapping indices of the set of SSBs to the first set of random access opportunities and the second set of random access opportunities. In some examples of the method, apparatuses, and non-transitory computer-readable medium described herein, mapping the one or more indices may include operations, features, means, or instructions for mapping an integer multiple of the set of SSBs to the first set of random access opportunities and the second set of random access opportunities. In some examples of the method, apparatuses, and non-transitory computer-readable medium described herein, transmitting the set of SSBs may include operations, features, means, or instructions for transmitting each of the set of SSBs with a different directional beam. In some examples of the method, apparatuses, and non-transitory computer-readable medium described herein, the first protocol type may be associated with a first set of UE capabilities and the second protocol type may be associated with a second set of UE capabilities.

DETAILED DESCRIPTION

Figure 1:
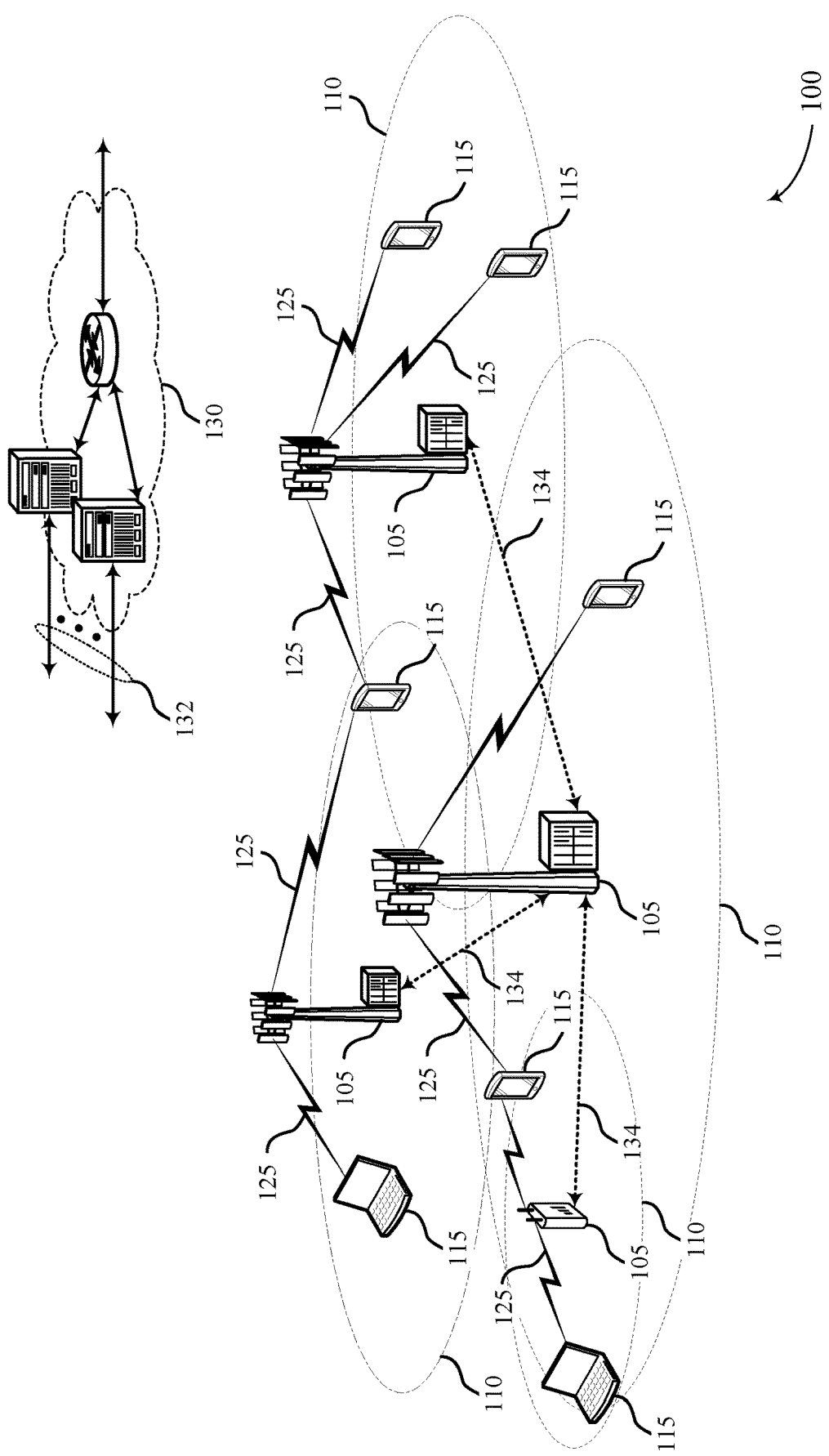
FIG. 1 illustrates an example of a wireless communications system that supports association of synchronization signal blocks (SSBs) to random access occasions in accordance with aspects of the present disclosure.

Various aspects of the present disclosure relate to methods, systems, devices, and apparatuses that support association of synchronization signal blocks (SSBs) to random access occasions. Some wireless communications systems may increase spectrum utilization and spectral efficiency, specifically through dynamic vertical (e.g., across the frequency domain) and horizontal (e.g., across the time domain) sharing of resources. For example, some wireless communications systems may support Light devices. Light devices, such as smart devices, wearable devices, smart sensors, etc., may communicate with a base station and operate in the same cell as other, non-Light devices, such as mobile broadband (MBB) devices. A Light device may also be referred to as a low-tier device for which premium features may not be needed or useful. In some cases, a Light device also may include sensors (for example, industrial sensors), cameras (for example, video monitoring devices), wearables, and low tier or relaxed Internet of Things (IoT) devices. Light devices may be used in a variety of applications, including healthcare, smart cities, transportation and logistics, electricity distribution, process automation, and building automation, just to name a few.

In some cases, New Radio (NR) services may include services for Light devices (e.g., NR-Light devices), as well as ultra-reliable low-latency communications (URLLC) devices and enhanced mobile broadband (eMBB) devices. In some cases, a Light user equipment (UE), such as an NR-Light UE, may be configured to transmit with a reduced transmit power compared to non-Light devices. For example, the uplink transmit power of an NR-Light UE may have a transmission power capability of, for example, 10 decibels (dBs) less than that of an MBB UE. While devices having relatively more limited capabilities may meet the requirements of, and support communications using, for example, narrowband Internet-of-Things (NB-IoT) and Long Term Evolution (LTE) for Machines (LTE-M), it may be challenging to support services of some limited capability devices (e.g., some industrial sensors, cameras, wearable devices, etc.) using these communications protocol types.

Thus, in some cases, techniques may be provided to support and provide like features for these limited capability devices and other low-end devices (e.g., in an NR wireless communications system). For example, a UE having a small form factor may have a smaller number of antennas, a UE may support a relatively smaller bandwidth than eMBB and URLLC devices, and/or a UE may be configured with an ultra-low UE power class to achieve power savings (e.g., limiting the UE to an 18 dBm peak power as compared to a 26 dBm peak power). In some cases, these limited capability devices may coexist with serving cells that provide connectivity for devices associated with existing protocols including, for example, eMBB or URLLC. In some cases, for example, for a low-tier UE configured with a relatively lower transmit peak power, preamble repetition may be implemented for random access channel (RACH) transmissions (e.g., physical RACH (PRACH) transmissions) to compensate coverage loss. In some cases, for example, during an initial access attempt, a separate configuration for RACH resources with non-overlapping time domain resources may be provided for the low-tier UE. This may allow a base station to distinguish RACH resources for the low-tier UEs from those of other UEs, and the base station may use a different RACH receiver for these configured resources. Additionally, or alternatively, when overlapping time domain resources are allocated for RACH transmissions for low-tier UEs and other UEs, additional RACH resources may be configured for a low-tier UE such that preamble repetitions do not significantly increase latency of RACH procedures for the low-tier UE. That is, some implementations may configure non-overlapping time domain resources for low-tier and high-tier UEs, but this approach may not work for some TDD systems with limited UL slots and may also increase RACH latency due to the large association period. Accordingly, in some examples, overlapping time domain RACH resources may be configured for low-tier and high-tier UEs and additional RACH resources for the low-tier UEs. In this manner, the RACH occasion at the same time domain resources may be associated with the same SSB for supporting an analog RF beamforming receiver at the base station.

Techniques are provided herein for a RACH configuration that provides coverage services to the low-tier UEs, allows these UEs to maintain their intended benefits (e.g., power savings), and does not significantly increase latency for low-tier UE RACH procedures. For example, a first technique is described herein in which the RACH configuration may allocate resources for RACH transmissions for low-tier UEs and other UEs with different time-domain resources (e.g., with overlapping or non-overlapping frequency-domain resources), thus providing TDM-based resource multiplexing between low-tier UEs (e.g., Light UEs and NR- Light UEs) and "high-tier UEs" (e.g., eMBB UEs and URLLC UEs). For example, a RACH configuration may indicate different RACH configuration indices corresponding to different sets of time-domain resources and overlapping frequency-domain resources. Additionally, or alternatively, a second technique is described herein in which the RACH configuration may allocate resources for RACH transmissions for low-tier UEs and other UEs with overlapping time-domain resources and different frequency-domain resources, thus providing frequency-division multiplexing (FDM)-based resource multiplexing between low-tier UEs and other UEs. For example, a RACH configuration may indicate different frequency-domain resources for the low-tier UEs and other UEs and overlapping sets of time-domain resources. Additionally, or alternatively, in some implementations, the RACH configuration may allocate resources for RACH transmissions for low-tier UEs and other UEs with both nonoverlapping time-domain resources and nonoverlapping frequency-domain resources.

Aspects of the disclosure are initially described in the context of a wireless communications system. Examples of transmission timelines and a process flow are then provided in accordance with some aspects of the disclosure. Aspects of the disclosure are further illustrated by and described with reference to apparatus diagrams, system diagrams, and flowcharts that relate to association of SSBs with random access occasions.

FIG. 1 illustrates an example of a wireless communications system 100 that supports association of SSBs with random access occasions in accordance with aspects of the present disclosure. The wireless communications system 100 includes base stations 105, UEs 115, and a core network 130. In some examples, the wireless communications system 100 may be a LTE network, a LTE-Advanced (LTE-A) network, a LTE-A Pro network, or a NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), NB-IoT, eMBB, or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency-division duplexing (FDD), time-division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency-division multiplexing (OFDM) or discrete Fourier transform spread OFDM (DFT-s-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time-division multiplexing (TDM) techniques, frequency-division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources. In some cases, a UE 115 may be an example of a Light device. For example, the UE 115 may be an example of a Light UE, such as an NR-Light UE or an NR-Light device. In some cases, an NR-Light UE may be referred to as a Low-Tier NR UE 115. Light devices may be, for example, smart devices, wearable devices, sensors, such as industrial sensors or video surveillance sensors, or other types of devices. Light devices may have a reduced transmit power compared to other types of NR devices. For example, the uplink transmit power of a Light UE may be up to or greater than 10 dB lower than an MBB or eMBB UE 115. In some cases, Light UEs may have a reduced transmit/receive bandwidth. For example, a Light UE may be configured with 5 MHz bandwidth or 10 MHz bandwidth, or some amount between, for both transmitting and receiving. A Light UE may have a reduced number of receive antennas. For example, a Light UE may use one or two receive antennas while MBB or eMBB UEs may use three, four, or more receive antennas. In some cases, a Light UE may have a lower equivalent receive signal-to-noise ratio (SNR). In some examples, the Light UEs may support generally reduced computation complexity. For example, the Light UEs may be low power devices, where increased complexity and processing may lead to higher power usage.

In some implementations, Light devices, such as a UE 115, may operate in the same cell as other UEs 115 which are not Light devices. In some cases, based on the reduced transmit power of the Light devices, Light devices may repeat uplink transmissions. For example, a Light UE 115 may transmit repetitions for RACH transmissions, reference signals, uplink control channel transmissions, uplink shared channel transmissions, or any combination thereof. This may assist a base station 105 in successfully detecting and decoding the uplink signals from the Light UE 115. In some cases, without transmitting repetitions, the base station 105 may be relatively less likely to successfully detect the uplink signaling from the Light UE 115, as the uplink transmissions with lower transmit power may be more susceptible to interference.

In some cases, a Light UE 115 may use different random access preamble formats than a non-Light device. In some examples, the Light UE 115 may be configured with dedicated random access preamble formats, and the dedicated random access preambles may be indicated in a SIB1. If dedicated preamble formats are not configured, the Light UE 115 may still use different preamble sequences than those used by non-Light devices. If the Light UE 115 used the same preamble sequences, the base station 105 may be relatively less likely to distinguish the NR-Light transmission repetitions across different transmission opportunities, such as RACH occasions.

In some cases, the base station 105 may transmit a configuration message, such as a RACH configuration, to the Light UE 115. The Light UE 115 may use information in the RACH configuration to gain initial access to a particular channel. The base station 105 may broadcast the RACH configuration in a system information message, such as a SIB1 message, which may be common to all the UEs 115 (e.g., common to Light UEs 115) within a coverage area 110 of the base station 105, and which may indicate a set of information to facilitate RACH procedures.

In some wireless communications systems 100 (e.g., an NR wireless communications systems), a RACH configuration may specify a certain set of values that these UEs 115 may then use to perform RACH procedures. In some cases, sets of parameters (e.g., presented in a look-up table) may be indexed according to a certain index (e.g. a PRACH configuration index). The sets of parameters may include a variety of parameters, such as a RACH configuration period (e.g., 10 ms, 20 ms, 40 ms, 80 ms, or 160 ms), a RACH format (or PRACH format), and a resource configuration that allocates certain resources (e.g., time, frequency, and/or spatial resources) for the RACH procedures. For example, in some cases, the resource configuration may be a time-domain resource configuration, which may indicate frame numbers, subframe numbers, a number of RACH slots per subframe, a number of RACH occasions (e.g., time-domain RACH occasions) per slot, and other like information.

Additionally, or alternatively to time-domain RACH configurations, some wireless communications systems 100 may configure frequency-multiplexed resources to be allocated for RACH communications (e.g., PRACH transmissions) For example, a RACH configuration may specify a number of sets of frequency-multiplexed resources for RACH procedures (e.g., 1, 2, 4, or 8 sets of frequency-multiplexed resources) that may correspond to sets of parameters, for example, according to an index (e.g. the PRACH configuration index).

In some cases, such as for contention-based random access procedures, an association between one or more SSBs in a set of SSBs (e.g., an SSB burst set) and corresponding sets or subsets of RACH resources (e.g., assigning resources for corresponding RACH preambles) may be defined or configured. In such cases, the base station 105 may indicate to one or more UEs 115 (e.g., in the RACH configuration or other configuration information) a set of parameters including, for example, a number of transmitted SSBs, a number of SSBs per RACH occasion, a number of contention-based RACH preambles per SSB for one or more RACH occasions, and other like information. In some cases, a mapping given by the RACH configuration may configure sets of resource within one RACH occasion with multiple preamble indices (e.g., in increasing order). For example, the mapping may provide an increasing order of preamble indices in one RACH occasion. Additionally, or alternatively, the mapping may provide an increasing order of indices according to FDM'd RACH occasions, then increasing according to a number of time division multiplexed RACH occasions within a slot (e.g., a RACH slot, or PRACH slot, configured for PRACH transmissions), and further in increasing order of a number of configured RACH slots.

Some wireless communications systems 100 (e.g., an NR wireless communications systems) may support a number of different mappings to associate SSBs with corresponding RACH resources. For example, different SSBs may be mapped to different sets of resources to be used as time division multiplexed RACH resources, or different SSBs may be mapped to overlapping sets of time resources for RACH transmissions (e.g., FDM'd RACH resources). Additionally, or alternatively, different SSBs may further correspond to different spatial resources, for example, to different directional downlink transmit and uplink receive beams.

In some cases, for example, in the case of different SSBs being mapped to different time division multiplexed RACH resources, a receiver of a base station 105 (e.g., a receive chain of a base station 105 including one or more antennas configured for directional beam communications) may be limited according to one or more constraints, such as an analog receive beamforming constraint (e.g., for communications in a radio frequency spectrum band above, e.g., a 6 GHz band, as may be configured for mmW communications). As such, the receiver of the base station 105 may be capable of using RACH resources (e.g., mapped to corresponding SSBs) using TDM, but may not be capable of using FDM multiplexed RACH resources (e.g., associated with different beams). A transmission scheme for such TDM RACH communications is described below with reference to FIG. 2. In other cases, however, a base station 105 may utilize a digital receive subsystem (e.g., digital receive chain) to receive RACH transmissions (e.g., using a radio frequency spectrum band below a 6 GHz band). Accordingly, the digital receivers of these base stations 105 may simultaneously receive RACH transmissions from different devices (e.g., different UEs 115) within the coverage area of the base station 105 that are located at geographically disparate locations, and thus the RACH transmissions may be simultaneously received from different directions. Thus, RACH procedures corresponding to one or multiple SSBs may be located together (e.g., using FDM'd resources overlapping in time). A transmission scheme for such FDM RACH communications is further described below with reference to FIG. 2.

However, in some cases, a low-tier UE (e.g., an NR-Light UE) may be configured with a relatively lower transmit peak power, and preamble repetition may be implemented for RACH transmissions to compensate coverage loss. In some cases, for example, during an initial access attempt, a separate configuration for RACH resources with non-overlapping time domain resources may be provided for the low-tier UE. This may allow a base station to distinguish RACH resources for the low-tier UEs from those of other UEs, and the base station may use a different RACH receiver for these configured resources or the same RACH receiver at a different time. Additionally, or alternatively, when overlapping time domain resources are allocated for RACH transmissions for low-tier UEs and other UEs, additional RACH resources may be configured for the low-tier UE such that preamble repetitions do not significantly increase latency of RACH procedures for low-tier UEs. Techniques are provided herein for a RACH configuration that provides coverage services to the low-tier UEs, allows these UEs to maintain their intended benefits (e.g., power savings), and that do not significantly increase latency for low-tier UE RACH procedures.

Figure 2:
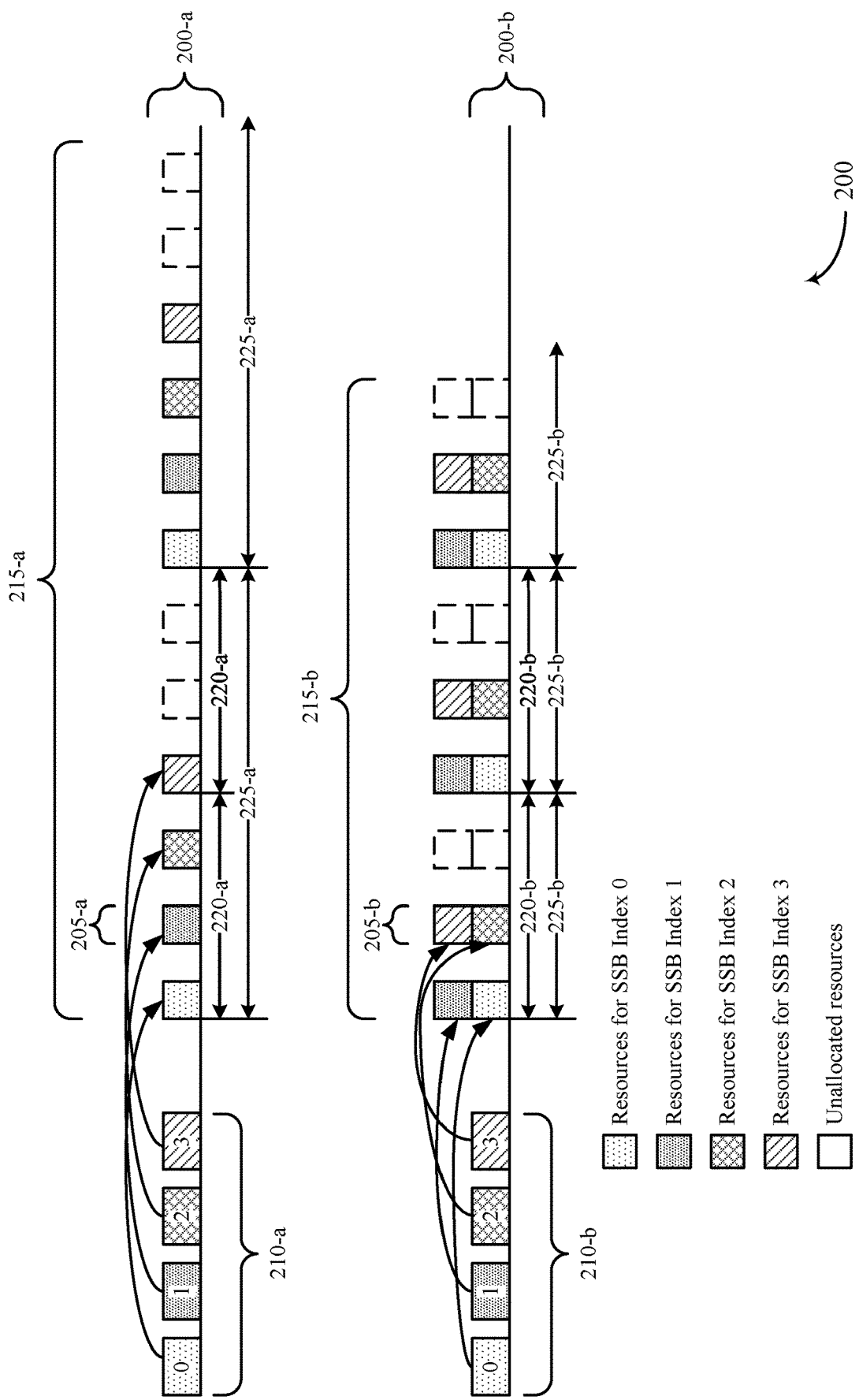
FIG. 2 illustrates example transmission timelines that support association of SSBs with random access occasions in accordance with aspects of the present disclosure.

FIG. 2 illustrates example transmission timelines 200 that support association of SSBs with random access occasions in accordance with aspects of the present disclosure. In some aspects, the transmission timelines 200 may implement aspects of the wireless communications 100, as described with reference to FIG. 1. The transmission timelines 200 are illustrated to represent frequency-domain resources along the y-axis and time-domain resources along the x-axis. The transmission timeline 200 may include operations performed to implement communications between a base station and one or more UEs, as described with reference to FIG. 1.

FIG. 2 includes a first transmission timeline 200-*a* showing resource allocations across a number of subframes 205-*a* and a second transmission timeline 200-*b* showing resource allocations across a number of subframes 205-*b*. In both the first transmission timeline 200-*a* and the second transmission timeline 200-*b*, certain resources, such as time-frequency resources (e.g., sets of time resources, frequency resources, or a combination) may be associated with certain SSB indices. For example, certain subframes are shown to be allocated for different ones of a first SSB index (e.g., SSB Index 0), a second SSB index (e.g., SSB Index 1), a third SSB index (e.g., SSB Index 2), a fourth SSB index (e.g., SSB Index 3), as well as unallocated resources.

The first transmission timeline 200-*a* illustrates an example of RACH occasions 215-*a* that are allocated using TDM and that correspond to different SSBs 210-*a*. As shown in the first transmission timeline, the SSBs 210-*a* include four individual SSB transmissions, with respective indices of 0, 1, 2, and 3. As indicated by the arrows, these SSBs correspond to respective sets of resources for the RACH occasions 215-*a*. For example, a first SSB 210-*a* corresponds to resources, here shown as one subframe, for a first RACH occasion 215-*a*, and so on.

The first transmission timeline 200-*a* shows two time periods configured for RACH procedures, which may be referred to as configuration periods 220-*a* or RACH configuration periods 220-*a*. As similarly described with reference to FIG. 1, a RACH configuration may include one or more parameters that indicate a value for a duration of the RACH configuration periods 220-*a*, for example, a value corresponding to one of 10 ms, 20 ms, 40 ms, 80 ms, or 160 ms. While the example transmission timelines 200 show the configuration periods 220 as having substantially similar durations, in some cases, the different configuration periods 220 within one association period 225 (as defined herein) may have different durations from one another.

The first transmission timeline 200-*a* also shows two association periods 225-*a*. An association period 225-*a* may be defined, for example, as a smallest value for an integer multiple for the configuration periods 220-*a* such that each of the available SSBs 210-*a* is mapped to at least one (or more) RACH occasion 215-*a* within the association period 225-*a*. For example, as shown by the transmission timeline 200-a, each configuration period 220-a has a duration that, according to the configured pattern for the RACH occasions 215-a, includes three RACH occasions 215-a. Because the example shown by the transmission timeline 200-a provides four SSBs 210-a, each SSB 210-a could not be mapped to at least RACH occasion 215-a within one configuration period 220-a. Thus, the association periods 225-a for the first transmission timeline 200-a are shown as including the smallest number of configuration periods 220-a including four or more RACH occasions 215-a, which here is two configuration periods 220-a.

In some cases, as shown in the example transmission timeline 200-a, an integer number of multiples (e.g., cycles) of RACH occasions 215-a mapped to the SSBs 210-a may result in a number of leftover RACH occasions 215-a. As shown, the final two RACH occasions 215-a of the first RACH occasion 215-a are unused and are thus not allocated or otherwise associated with the SSBs 210-a.

As also described with reference to FIG. 1, some wireless communications systems may increase spectrum utilization and spectral efficiency, specifically through dynamic vertical (e.g., across the frequency domain) and horizontal (e.g., across the time domain) sharing of resources. In some cases, different protocol types, such as eMBB, URLLC, and massive machine-type communication (mMTC) may use these techniques in combination with UEs having limited capabilities, such as IoT devices. While devices having relatively more limited capabilities may meet the requirements of, and support communications using, for example, NB-IoT or LTE-M, these communication protocols may not be sufficient in some ways to support some limited capability devices (e.g., some industrial sensors, cameras, wearable devices, etc.).

Thus, in some cases, techniques may be provided to support and provide like features for these limited capability devices and other low-end devices (e.g., in an NR wireless communications system). For example, a UE with a small form factor may have a smaller number of antennas (e.g., according to a 1T2R form factor, corresponding to 1 transmit antenna and 2 receive antennas), a UE may support a relatively smaller bandwidth than eMBB and URLLC devices, and/or a UE may be configured with an ultra-low UE power class to achieve power savings (e.g., limiting the UE to an 18 dBm peak power as compared to a 26 dBm peak power). In some cases, these limited capability devices may coexist within serving cells that provide services for other devices, such as eMBB or URLLC devices.

In some cases, for example, for a low-tier UE (e.g., an NR-Light UE) configured with a relatively lower transmit peak power, preamble repetition may be implemented for RACH transmissions (e.g., PRACH transmissions) to compensate coverage loss. In some cases, a separate configuration for RACH resources may be provided for the low-tier UE. This may allow a base station to distinguish RACH resources for the low-tier UEs from those of other UEs, and the base station may use a different RACH receiver for these configured resources, or, alternatively, the base station may use the same RACH receiver during different RACH occasions. Additionally, or alternatively, when overlapping time domain resources are allocated for RACH transmissions for low-tier UEs and other UEs, additional RACH resources may be configured for the low-tier UE such that preamble repetitions do not significantly increase latency of RACH procedures for low-tier UEs.

Techniques are provided herein for a RACH configuration that provides coverage services to the low-tier UEs, allows these UEs to maintain their intended benefits (e.g., power savings), and does not significantly increase latency for low-tier UE RACH procedures. For example, a first technique is described herein in which the RACH configuration may allocate resources for RACH transmissions for low-tier UEs and other UEs with overlapping frequency-domain resources and different time-domain resources, thus providing TDM-based resource multiplexing between low-tier UEs (e.g., Light UEs and NR-Light UEs) and "high-tier UEs" (e.g., eMBB UEs and URLLC UEs). For example, a RACH configuration may indicate different RACH configuration indices corresponding to different (e.g., nonoverlapping) sets of time-domain resources and the same (or partially overlapping) frequency-domain resources (e.g., according to a frequency starting offset). Additionally, or alternatively, a second technique is described herein in which the RACH configuration may allocate resources for RACH transmissions for low-tier UEs and other UEs with overlapping time-domain resources and different frequency-domain resources, thus providing FDM-based resource multiplexing between low-tier UEs and other UEs. For example, a RACH configuration may indicate different frequency-domain resources (e.g., according to a frequency starting offset) for the UEs and overlapping sets of time-domain resources (e.g., according to a PRACH configuration index). Additionally, or alternatively, a third technique is described herein in which the RACH configuration may allocate resources for RACH transmissions for low-tier UEs and other UEs with both nonoverlapping time-domain resources and nonoverlapping frequency-domain resources. In some examples and implementations, to enable intended benefits (e.g., power savings), one or more integrated circuits (e.g., transceivers, processors, etc.) of a UE (e.g., low-tier UEs) may implement the RACH configuration and power savings techniques discussed herein to improve RACH transmissions and reduce overall power consumption for the UE.

Figure 3:
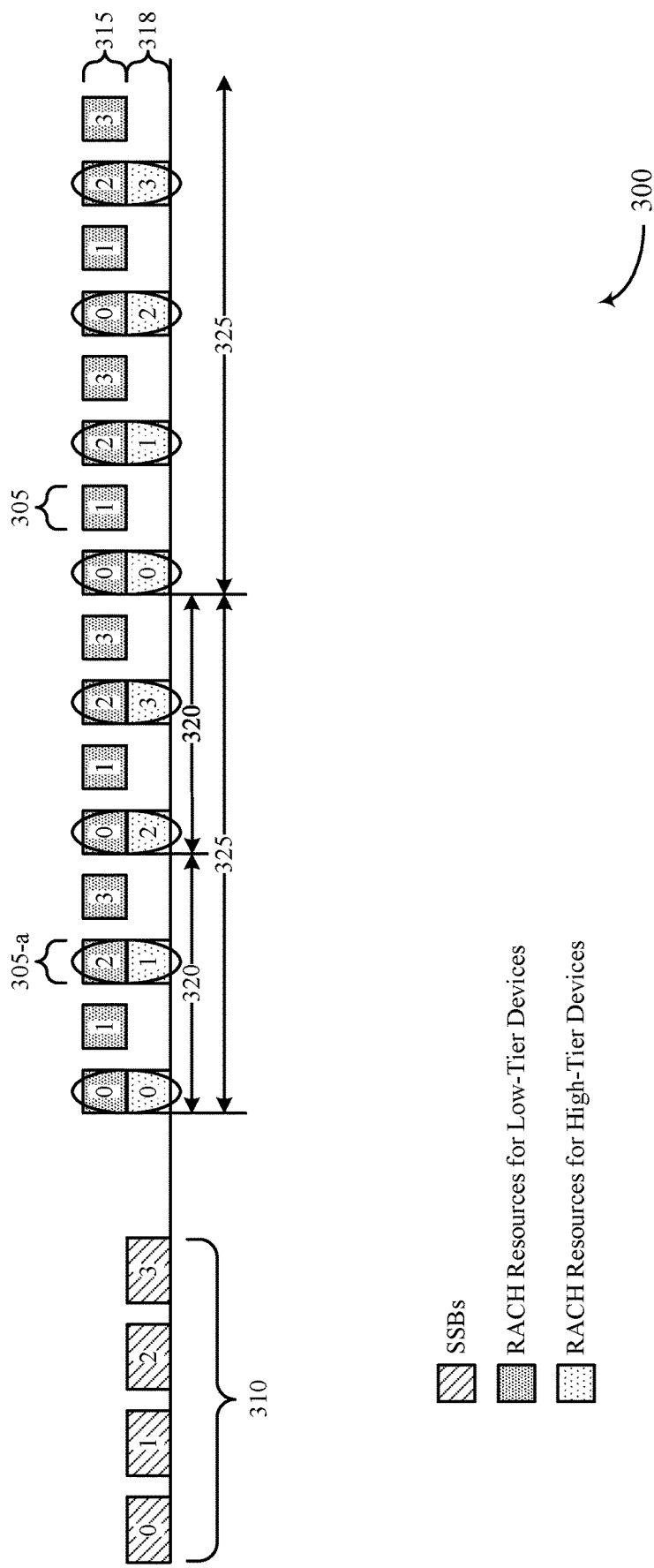
FIG. 3 illustrates an example of a transmission timeline that supports association of SSBs with random access occasions in accordance with aspects of the present disclosure.

FIG. 3 illustrates an example of a transmission timeline 300 that supports association of SSBs with random access occasions in accordance with aspects of the present disclosure. In some aspects, the transmission timelines 300 may implement aspects of the wireless communications 100, as described with reference to FIG. 1. The transmission timelines 300 are illustrated to represent frequency-domain resources along the y-axis and time-domain resources along the x-axis. The transmission timeline 300 may include operations performed to implement communications between a base station and one or more UEs, as described with reference to FIG. 1.

The transmission timeline 300 shows a resource allocation across a number of slots or subframes 305. Resources of the slots or subframes 305, such as time-frequency resources (e.g., sets of time resources, frequency resources, or a combination) may be associated with corresponding SSB indices of associated ones of the SSBs 310, which are illustrated by the numbers set in the respective sets of resources in each slot or subframe 305. For example, certain slots or subframes 305 are shown to be allocated for different ones of a first SSB index (e.g., SSB Index 0), a second SSB index (e.g., SSB Index 1), a third SSB index (e.g., SSB Index 2), and a fourth SSB index (e.g., SSB Index 3).

The transmission timeline 300 illustrates an example of a separate configuration for RACH resources for two different types of UEs, for example, UEs having different sets of capabilities. For example, low-tier resources 315 show a resource allocation including a pattern for frequency-domain and time-domain resources allocated for low-tier UEs (e.g., NR-Light UEs, etc.). High-tier resources 318 show a resource allocation including a pattern for frequency- and time-domain resources allocated for high-tier UEs (e.g., eMBB UEs, URLLC UEs, etc.). The low-tier resources 315 may comprise more time domain transmission opportunities such that preamble repetitions do not significantly increase latency of RACH procedures for low-tier UEs.

The transmission timeline 300 shows a number of ellipses across the resource allocation for the low-tier resources 315 and the resource allocation for the high-tier resources 318 at a number of slots or subframes 305. These ellipses correspond to resources that may be at least partially common between the low-tier resources 315 and the high-tier resources 418 (e.g., overlapping time-domain resources, but different frequency-domain resources). The resources may be, for example, fully overlapping (e.g., sharing a set of time-domain resources) or partially overlapping. While the example transmission timeline 300 shows the low-tier resources 315 as being contiguous with the high-tier resources 318 along the y-axis in the frequency domain, in other implementations the low-tier resources 315 may be separated in the radio frequency spectrum from the high-tier resources 318 (e.g., separated by a bandwidth gap. Additionally, or alternatively, in some implementations the low-tier resources 315 may fully or partially overlap with the high-tier resources 318 in the frequency domain (e.g., for time division multiplexed resources that do not overlap in the time domain).

The transmission timeline 300 shows two configuration periods 320 (or, alternatively, RACH configuration periods 320). As similarly described with reference to FIGS. 1 and 2, a RACH configuration may include one or more parameters that indicate a value for a duration of the RACH configuration periods 320, for example, a value corresponding to one of 10 ms, 20 ms, 40 ms, 80 ms, or 160 ms. While the example transmission timeline 300 shows the configuration periods 320 as having substantially similar durations, in some cases, the different configuration periods 320 within one association period 325 (as defined herein) may have different durations from one another.

The transmission timeline 300 also shows two association periods 325. As similarly described with reference to FIGS. 1 and 2, an association period 325 may be defined as a smallest value for an integer multiple for the configuration periods 320 such that each of the available SSBs 310 is mapped to at least one (or more) RACH occasion within the association period 325. In some cases, the configuration periods 320 for the high-tier resources 318 and the low-tier resources 315 may be different. In such cases, the association period 325 may be defined for each tier of devices as the smallest value for an integer multiple of the configuration periods 320 for the high-tier resources 318 and the low-tier resources 315 such that each of the available SSBs 310 is mapped to at least one (or more) RACH occasions within the association period 325 for both high-tier resources 318 and low-tier resources 315. That is, each of the SSBs 310 may be mapped at least once within the association period 325 for both high-tier resources 318 and low-tier resources 315. As shown by the transmission timeline 300, each configuration period 320 has a duration that, according to the configured pattern for the RACH occasions for the high-tier resources 318, includes four RACH occasions. For the low-tier devices, the low-tier resources 315 of a configuration period 320 satisfy the requirement, because the example shown by the transmission timeline 300 provides four SSBs 310 in a configuration period 320, thus an association period for the low-tier devices may be the same as the configuration periods 320. However, for the high-tier devices, each SSB 310 could not be mapped to at least RACH occasion for the high-tier resources 318 within one configuration period 320. Thus, for the high-tier devices, the association periods 325 (as illustrated in the transmission timeline 300) are shown as including the smallest value of configuration periods 320 having an equal or greater number of RACH occasions than the number of SSBs (e.g., in this case four SSBs 310), which here is two configuration periods 320.

In some cases, a set of resources of a slot or subframe 305 (e.g., the slot coinciding with a subframe 305-a, as, in the example transmission timeline 300, the slot and the subframe 305-a have a same length) may be configured for RACH transmissions for both low-tier UEs and high-tier UEs. Thus, at the subframe 305-a, and the other subframes 305 with ovals around the illustrated PRACH occasions, the low-tier resources 315 are multiplexed with the high-tier resources 318 using FDM.

As shown the indices within each set of resources allocated for the SSBs 310 and for the RACH occasions of both the low-tier resources 315 and the high-tier resources 318, the SSBs are associated with corresponding RACH occasions, as similarly described with reference to FIG. 2 (although associations are not shown with corresponding shading of the RACH occasions in FIG. 3).

The SSBs may be associated with one or more of the multiplexed RACH occasions independently for the high-tier devices and for the low-tier devices. That is, the SSBs may be mapped to the RACH occasions configured for the high-tier UEs (e.g., in an increasing order), and may also be mapped independently to the RACH occasions configured for the low-tier UEs. For example, at the subframe 305-a, the low-tier resources 315 are associated with a third SSB index (e.g., an index of 2), while the high-tier resources 318 are associated with a second SSB index (e.g., an index of 1). Some wireless communications systems may not support communicating over one RACH occasion that is associated with multiple different SSBs, for example, a receiver of a base station may be limited according to an analog receive beamforming constraint.

Thus, according to a first technique provided herein, a RACH configuration may configure an offset in the time-domain (e.g., a slot or subframe offset) for the time-frequency resources that are to be allocated for the RACH occasions to be used by low-tier UEs. In some cases, the RACH configuration may include one or more parameters indicating the slot or subframe offset. That is, the RACH configuration may include a RACH configuration index that indicates (e.g., via a look-up table that may be the same look-up table used for RACH configuration indices for high-tier UEs) the slots or subframes 305 for RACH occasions, along with an indication of the offset. Based on the slot or subframe offset (which is not shown in FIG. 3), the time-domain low-tier resources 315 to be used by the low-tier UEs for RACH transmissions will be offset from the time-domain high-tier resources 318 to be used by the high-tier UEs for RACH transmissions. That is, the low-tier resources 315 and the high-tier resources 318 may be time division multiplexed in different time slots or subframes 305. In this way, the RACH configuration may ensure that at least two subframes 305 (e.g., at least one subframe 305 for the low-tier resources 315 and at least one subframe 305 for the high-tier resources 318) may be reserved for RACH transmissions in each of the configuration periods 320. In some cases, however, some wireless communication systems (e.g., some TDD wireless communication systems) may have only one subframe 305 per configuration period 320 that may be reserved for PRACH transmissions. Consequently, using different time slots for high-tier device communications and low-tier device communications may not be possible for some wireless communication systems.

Additionally, or alternatively, according to a second technique provided herein, a RACH configuration may include multiple RACH configuration indices for low-tier devices to provide a joint association between an SSB 310 and multiple sets of time-frequency resources for RACH transmissions according to the multiple RACH configuration indices.

For example, the RACH configuration may indicate low-tier resources 315 for low-tier device RACH transmissions via a first RACH configuration index corresponding to a first set of time-domain resources and a second RACH configuration index corresponding to a second set of time-domain resources, where, for example, the first set of time-domain resources may overlap with the set of time-domain high-tier resources 318 allocated to high-tier devices (e.g., being a same set of time-domain resources, or at least partially overlapping in time). In this way, a low-tier device may use a combination of the first set of resources and the second set of resources for RACH transmissions, thus providing a relatively improved likelihood that the RACH transmissions, and any repetitions of the RACH transmissions, result in a successful RACH procedure.

According to the techniques described herein, a communications device (e.g., a low-tier UE) performing a RACH procedure may perform a cyclic mapping to associate SSBs 310, as transmitted from a base station, with RACH occasions (e.g., according to RACH configuration indices indicated in a RACH configuration) during which the communications device may transmit RACH transmissions as part of a RACH procedure to access a channel.

To perform the cyclic mapping, the UE may firstly map one or more SSBs 310 transmitted from a base station to the UE for one or more RACH occasions (e.g., the low-tier resources 315 allocated for RACH transmissions from the low-tier UE, as described herein) within an association period 325 according to a first RACH configuration index that the UE received (e.g., in a system information block (SIB) received from the base station). For example, the UE may sequentially map the SSBs 310 to corresponding RACH occasions within the association period 325. That is, the UE may map a first SSB 310 to a first RACH occasion, a second SSB 310 to a second RACH occasion, and so on. The UE may then map the SSBs 310 to additional RACH occasions within the association period 325 according to a second RACH configuration index. For example, the UE may continue to sequentially map the SSBs 310 to corresponding RACH occasions within the association period 325 following from the previously mapped SSBs 310 and RACH occasions. The UE may map the first-mapped SSBs 310 to sequential RACH occasions until an integer number of cycles of the SSB-to-RACH occasion mapping is reached. After all of the SSBs 310 have been mapped, any remaining RACH occasions of an association period 325 may not be used by the UE (e.g., alternatively allocated for other purposes). Alternatively, in some cases, rather than a sequential mapping, a particular pattern may be defined or configured, where the UE may, for example, independently map the SSBs to RACH occasions of each of multiple RACH configurations.

As described with reference to FIG. 2, an association period 325 may be defined, for example, as a smallest value for an integer multiple for the configuration periods 320 such that each of the available SSBs 310 is mapped to at least one (or more) RACH occasion within the association period 325. In the case that one RACH configuration indicates two or more RACH configuration indices, as described herein, where the RACH configuration indices correspond to configuration periods 320 of different lengths, the UE may determine the association period 325, for example, using a maximum of the configuration periods 320.

Figure 4:
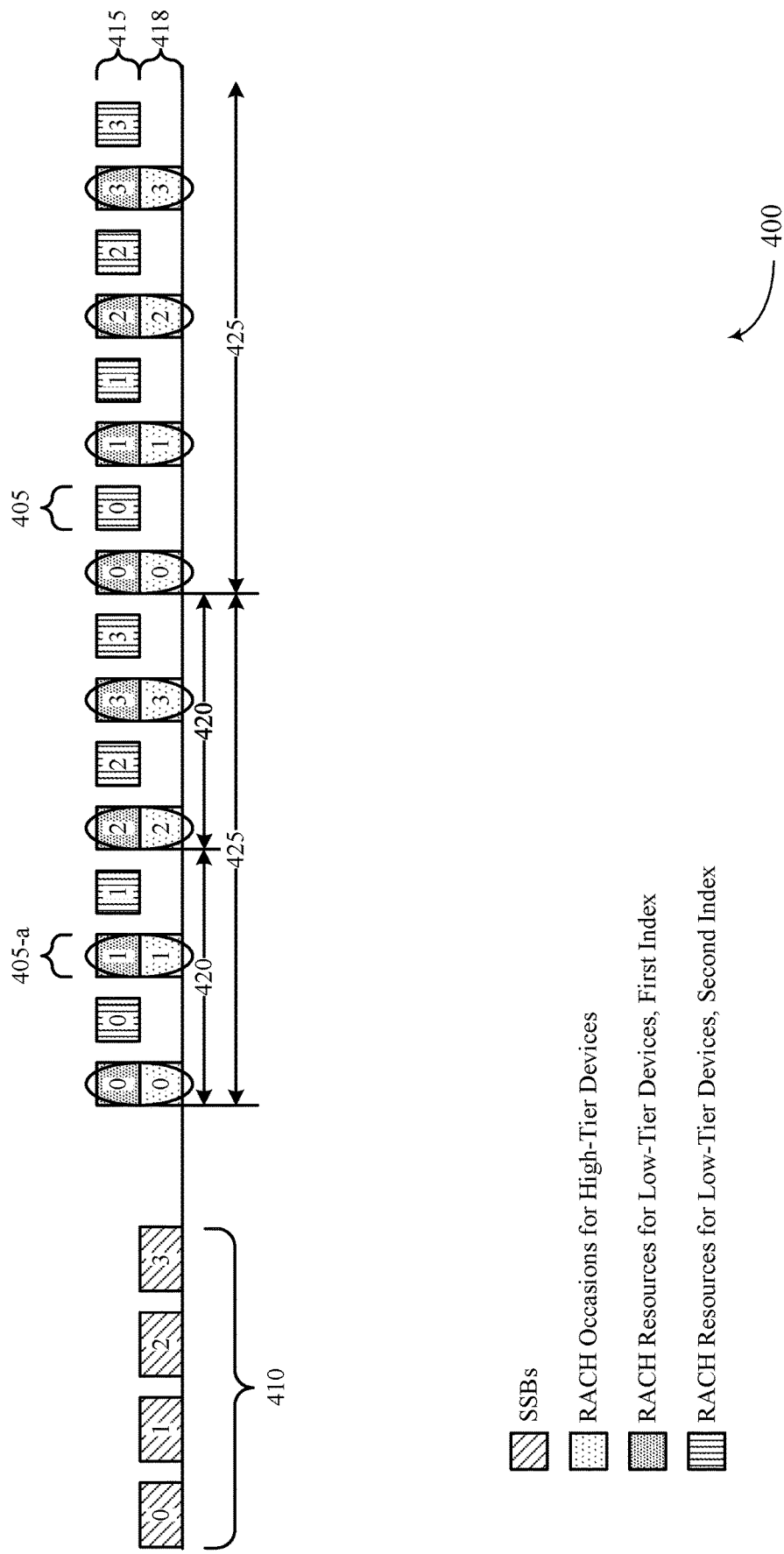
FIG. 4 illustrates an example of a transmission timeline that supports association of SSBs with random access occasions in accordance with aspects of the present disclosure.
Figure 5:
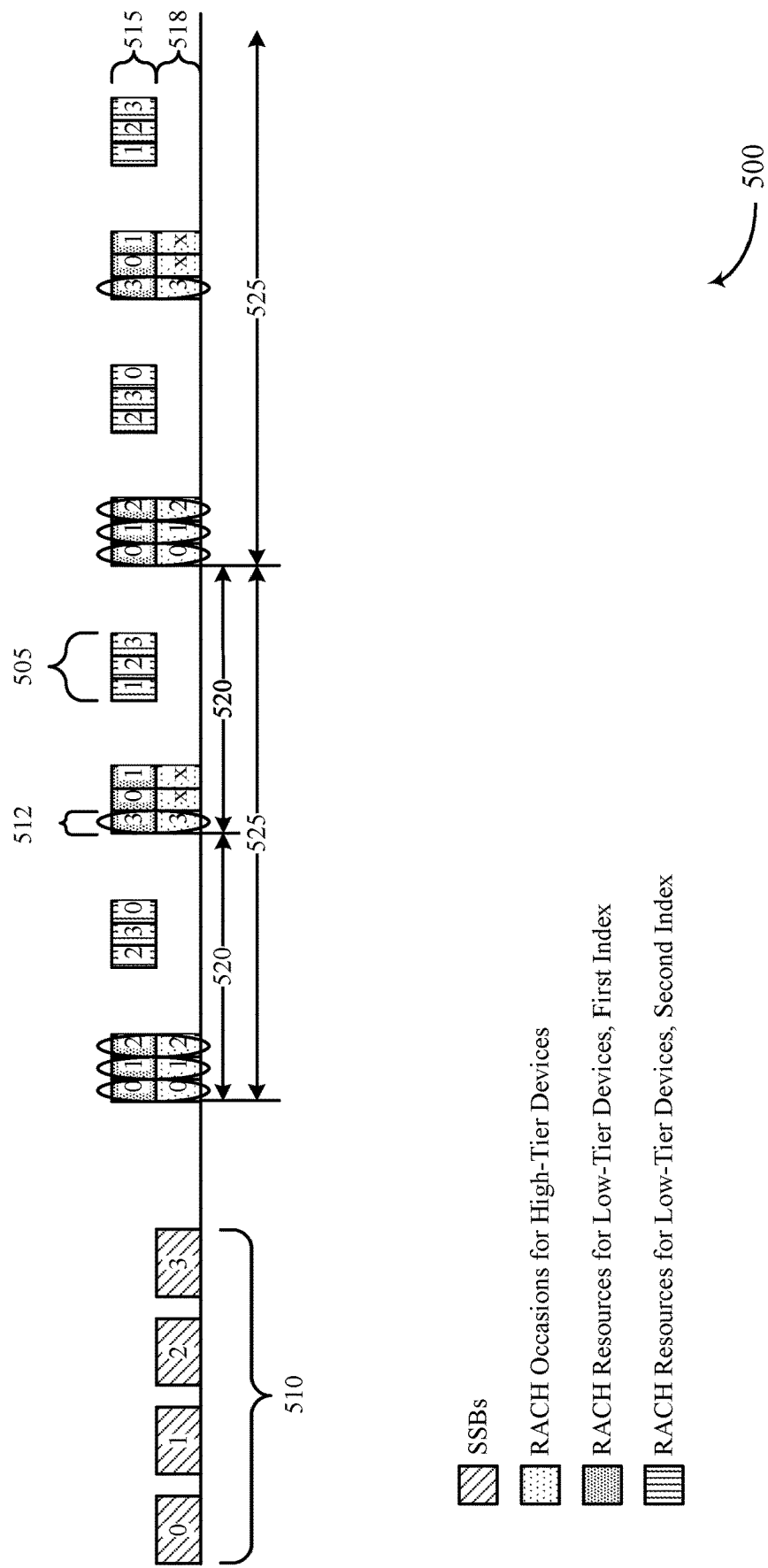
FIG. 5 illustrates an example of a transmission timeline that supports association of SSBs with random access occasions in accordance with aspects of the present disclosure.

The following FIGS. 4 and 5 illustrate example SSB-to-RACH occasion mappings according to the techniques described herein.

FIG. 4 illustrates an example of a transmission timeline 400 that supports association of SSBs with random access occasions in accordance with aspects of the present disclosure. In some aspects, the transmission timelines 400 may implement aspects of the wireless communications 100, as described with reference to FIG. 1. The transmission timelines 400 are illustrated to represent frequency-domain resources along the y-axis and time-domain resources along the x-axis. The transmission timeline 400 may include operations performed to implement communications between a base station and one or more UEs, as described with reference to FIG. 1. The example transmission timeline 400 shows an example of a resource allocation for RACH transmissions for two different protocol types of devices, where a RACH configuration for the RACH transmissions provides a long sequence based preamble format for the RACH transmissions (e.g., including a maximum of one RACH transmission in the time domain per slot or subframe 405).

The transmission timeline 400 shows a resource allocation across a number of slots or subframes 405. Resources of the slots or subframes 405, such as time-frequency resources (e.g., sets of time resources, frequency resources, or a combination) may be associated with corresponding SSB indices of associated ones of the SSBs 410, which are illustrated by the numbers set in the respective sets of resources in each slot or subframe 405. For example, certain subframes are shown to be allocated for different ones of a first SSB index (e.g., SSB Index 0), a second SSB index (e.g., SSB Index 1), a third SSB index (e.g., SSB Index 2), and a fourth SSB index (e.g., SSB Index 3).

The transmission timeline 400 also illustrates an example of a set of resource allocations for RACH occasions for two different types of UEs, for example, UEs having different sets of capabilities. For example, low-tier resources 415 show a resource allocation including a pattern for frequency- and time-domain resources allocated for low-tier UEs (e.g., NR-Light UEs, etc.). High-tier resources 418 show a resource allocation including a pattern for frequency- and time-domain resources allocated for high-tier UEs (e.g., eMBB UEs, URLLC UEs, etc.). In some cases, one or more further resource allocations may be defined for one or more additional sets of UEs (e.g., for three or more different tiers of device capabilities).

The transmission timeline 400 shows a number of ellipses across the resource allocation for the low-tier resources 415 and the resource allocation for the high-tier resources 418 at a number of slots or subframes 405. These ellipses correspond to resources that may be at least partially common between the low-tier resources 415 and the high-tier resources 418 (e.g., overlapping time-domain resources, but different frequency-domain resources). The resources may be, for example, fully overlapping (e.g., sharing a set of time-domain resources) or partially overlapping. While the example transmission timeline 400 shows the low-tier resources 415 as being contiguous with the high-tier resources 418 along the y-axis in the frequency domain, in other implementations the low-tier resources 415 may be separated in the radio frequency spectrum from the high-tier resources 418 (e.g., separated by a bandwidth gap. Additionally, or alternatively, in some implementations the low-tier resources 415 may fully or partially overlap with the high-tier resources 418 in the frequency domain (e.g., for time division multiplexed resources that do not overlap in the time domain).

The transmission timeline 400 shows two configuration periods 420 (or, alternatively, RACH configuration periods 420). As similarly described with reference to FIGS. 1 and 2, a RACH configuration may include one or more parameters that indicate a value for a duration of the RACH configuration periods 420, for example, a value corresponding to one of 10 ms, 20 ms, 40 ms, 80 ms, or 160 ms. While the example transmission timeline 400 shows the configuration periods 420 as having substantially similar durations, in some cases, the different configuration periods 420 within one association period 425 (as defined herein) may have different durations from one another. The transmission timeline 400 also shows two association periods 425. As similarly described herein, the association periods 425 for the transmission timeline 400 are shown as including the smallest value for an integer multiple for four SSBs 410, which here is two configuration periods 420. In some cases, as described herein, a UE may receive multiple RACH configurations corresponding to different sets of parameters. In such cases, the association periods 425 may be determined based on only a first RACH configuration of the multiple configurations (e.g., a first RACH configuration in time).

As described herein, the example transmission timeline 400 illustrates an example of a set of resource allocations for RACH transmissions for two different protocol types of devices, where the RACH configuration for the RACH transmissions provides a long sequence based preamble format for the RACH transmissions. That is, the RACH configuration includes one or more parameters that indicate a number of RACH slots within each slot or subframe 405 of a respective association period. According to the long sequence based preamble format shown and described in the example transmission timeline 400 of FIG. 4, the RACH configuration indicates that the number of RACH slots within each slot or subframe 405 is one (i.e., the length of a RACH slot and the slots or subframes 405 are equal).

To perform a cyclic mapping, a UE may first map one or more SSBs 410 transmitted from a base station to the UE for one or more RACH occasions (e.g., the low-tier resources 415 allocated for RACH transmissions from the low-tier UE, as described herein) within an association period 425 according to a first RACH configuration index that the UE received. In the example of FIG. 4, the UE may receive a RACH configuration including a first RACH configuration index that reserves a first set of resources. For example, the first RACH configuration index may allocate the set of resources that corresponds to the resources of the slots or subframes 405 allocated for the high-tier resources 418 (as illustrated in FIG. 4 by the "RACH Resources for Low-Tier Devices, First Index"). As similarly described herein, the UE may sequentially map the SSBs to these sets of resources corresponding to RACH occasions. As can be seen, mapping the SSBs to the "RACH Resources for Low Tier Devices, First Index" within each association period 425 begins with the SSB having the 0 index, followed by the 1, 2, and 3 indices.

The RACH configuration may also include a second RACH configuration index that defines a second set of resources that are nonoverlapping with the slots or subframes 405 allocated for the high-tier resources 418 (as illustrated in FIG. 4 by the "RACH Resources for Low-Tier Devices, Second Index"). As similarly described herein, the UE may sequentially (or, alternatively, independently according to an independent pattern) map the SSBs to these sets of resources corresponding to RACH occasions. For example, when the second RACH configuration index is applied, mapping of SSBs may follow from this sequence sequentially, as shown in FIG. 4. Thus, mapping the SSBs to the resources associated with "RACH Resources for Low Tier Devices, Second Index" may begin using a next cyclical index after mapping using the first RACH configuration index, which in this case starts over with SSB index 0. Alternatively, the UE may independently map the indices of the RACH configuration to corresponding SSBs based on, for example, a given or determined pattern that is to be achieved. According to the example transmission timeline 400 shown in FIG. 4, the low-tier UE may realize a relatively improved likelihood for its RACH transmissions, and any repetitions of the RACH transmissions, to result in successful RACH procedures granting the UE access to the channel.

FIG. 5 illustrates an example of a transmission timeline 500 that supports association of SSBs with random access occasions in accordance with aspects of the present disclosure. In some aspects, the transmission timelines 500 may be implemented by aspects of the wireless communications system 100, as described with reference to FIG. 1. The transmission timelines 500 are illustrated to represent frequency-domain resources along the y-axis and time-domain resources along the x-axis. The transmission timeline 500 may include operations performed to implement communications between a base station and one or more UEs, as described with reference to FIG. 1. The example transmission timeline 500 shows an example of a resource allocation for RACH transmissions for two different protocol types of devices, where a RACH configuration for the RACH transmissions provides a short sequence based preamble format for the RACH transmissions (e.g., including multiple RACH transmissions in the time domain per slot or subframe 505).

The transmission timeline 500 shows a resource allocation across a number of subframes 505. Resources of the subframes 505, such as time-frequency resources (e.g., sets of time resources, frequency resources, or a combination) may be associated with corresponding SSB indices of associated ones of the SSBs 510, which are illustrated by the numbers set in the respective sets of resources in each subframe 505. For example, certain subframes are shown to be allocated for different ones of a first SSB index (e.g., SSB Index 0), a second SSB index (e.g., SSB Index 1), a third SSB index (e.g., SSB Index 2), and a fourth SSB index (e.g., SSB Index 3).

The transmission timeline 500 also illustrates an example of a set of resource allocations for RACH occasions 512 for two different types of UEs, for example, UEs having different sets of capabilities. For example, low-tier resources 515 show a resource allocation including a pattern for frequency- and time-domain resources allocated for low-tier UEs (e.g., NR-Light UEs, etc.). High-tier resources 518 show a resource allocation including a pattern for frequency- and time-domain resources allocated for high-tier UEs (e.g., eMBB UEs, URLLC UEs, etc.). In some cases, one or more further resource allocations may be defined for one or more additional sets of UEs (e.g., for three or more different tiers of device capabilities).

The transmission timeline 500 shows a number of ellipses across the resource allocation for the low-tier resources 515 and the resource allocation for the high-tier resources 518 at a number of slots or subframes 505. These ellipses correspond to resources that may be at least partially common between the low-tier resources 515 and the high-tier resources 518 (e.g., overlapping time-domain resources, but different frequency-domain resources). The resources may be, for example, fully overlapping (e.g., sharing a set of time-domain resources) or partially overlapping. While the example transmission timeline 500 shows the low-tier resources 515 as being contiguous with the high-tier resources 518 along the y-axis in the frequency domain, in other implementations the low-tier resources 515 may be separated in the radio frequency spectrum from the high-tier resources 518 (e.g., separated by a bandwidth gap. Additionally, or alternatively, in some implementations the low-tier resources 515 may fully or partially overlap with the high-tier resources 518 in the frequency domain (e.g., for time division multiplexed resources that do not overlap in the time domain).

The transmission timeline 500 shows two configuration periods 520 (or, alternatively, RACH configuration periods 520). As similarly described with reference to FIGS. 1 and 2, a RACH configuration may include one or more parameters that indicate a value for a duration of the RACH configuration periods 520, for example, a value corresponding to one of 10 ms, 20 ms, 40 ms, 80 ms, or 160 ms. While the example transmission timeline 500 shows the configuration periods 520 as having substantially similar durations, in some cases, the different configuration periods 520 within one association period 525 may have different durations from one another. The transmission timeline 500 shows two association periods 525. As similarly described herein, an association period 525 may be defined as a smallest value for an integer multiple for the configuration periods 520 such that each of the available SSBs 510 is mapped to at least one (or more) RACH occasion 512 within the association period 525.

The example transmission timeline 500 illustrates an example of a set of resource allocations for RACH transmissions for two different protocol types of devices, where the RACH configuration for the RACH transmissions provides a short sequence based preamble format for the RACH transmissions. That is, the RACH configuration includes one or more parameters that indicate a number of time-domain RACH transmission occasions within each slot or subframe 505 of the respective association periods 525. According to the short sequence based preamble format shown and described in the example transmission timeline 500 of FIG. 5, the RACH configuration indicates that the number of time-domain RACH transmission occasions within each slot or subframe 405 is three (i.e., three RACH slots are shown within each subframe 505).

As shown by the transmission timeline 500, each configuration period 520 has a duration that, according to the configured pattern for the RACH occasions 512 for the high-tier resources 518, includes six RACH occasions 512 (where three RACH occasions 512 are within each subframe 505). While the low-tier resources 515 satisfy the requirement in the first configuration period 520, each SSB 510 could not be mapped to at least one RACH occasion 512 for the high-tier resources 518 within one configuration period 520. Thus, the association periods 525 for the transmission timeline 500 are shown as including the smallest value of configuration periods 520 having an equal or greater number of RACH occasions 512 than the number of SSBs 310 (e.g., in this case four SSBs 310), which here is two configuration periods 520.

In some cases, one or more last RACH occasions 512 of the first association periods 525 may be left as a remainder of the smallest value for the integer multiple of different numbers of SSBs 510 and other RACH formats. For example, as shown in the example transmission timeline 500 of FIG. 5, the last two RACH occasions 512 for the high-tier resources 518 would remain unused, because a last index of the SSBs 510 (e.g., SSB index 3) is mapped to the first RACH occasion 512 of its corresponding subframe 505, with two remaining RACH occasions 512 in the corresponding subframe 505. In such cases, the remainder RACH occasions may remain unused and thus may not be allocated or otherwise associated with the RACH procedures.

As similarly described with reference to FIG. 3, to perform a cyclic mapping, a UE may first map one or more SSBs 510 transmitted from a base station to the UE for one or more RACH occasions (e.g., the low-tier resources 515 allocated for RACH transmissions from the low-tier UE, as described herein) within an association period 525 according to a first RACH configuration index that the UE received. In the example of FIG. 5, the UE may receive a RACH configuration including a first RACH configuration index that reserves the set of resources that corresponds to the resources of the slots or subframes 505 allocated for the high-tier resources 518 (as illustrated in FIG. 5 by the "RACH Resources for Low-Tier Devices, First Index"). For example, the first RACH configuration index for the low-tier UEs may be the same as the RACH configuration index for high-tier UEs (e.g., assigning different RACH preambles to low-tier and high-tier UEs when the same RACH configuration index is used). As similarly described herein, the UE may sequentially map the SSBs to these sets of resources corresponding to RACH occasions. As can be seen, mapping of the SSBs to the "RACH Resources for Low Tier Devices, First Index" begins with the SSB having an index of 0, followed by the 1, 2, 3, 0, and 1 indices.

The RACH configuration may also include a second RACH configuration index for the low-tier UEs that defines a second set of resources that are nonoverlapping with the slots or subframes 405 allocated for the high-tier resources 418 (as illustrated in FIG. 4 by the "RACH Resources for Low-Tier Devices, Second Index"). As similarly described herein, the UE may sequentially (or, alternatively, independently, e.g., according to an independent pattern) map the SSBs to these sets of resources corresponding to RACH occasions. That is, when the second index is applied, it may follow from the next SSB index from where the mapping left off for the first RACH configuration index (e.g., SSB index 2), as shown in FIG. 4. Alternatively, the UE may independently map the indices of the RACH configuration to corresponding SSBs based on, for example, a given or determined pattern that is to be achieved. According to the example transmission timeline 400 shown in FIG. 4, the low-tier UE may realize a relatively improved likelihood for its RACH transmissions, and any repetitions of the RACH transmissions, to result in successful RACH procedures granting the UE access to the channel.

Figure 6:
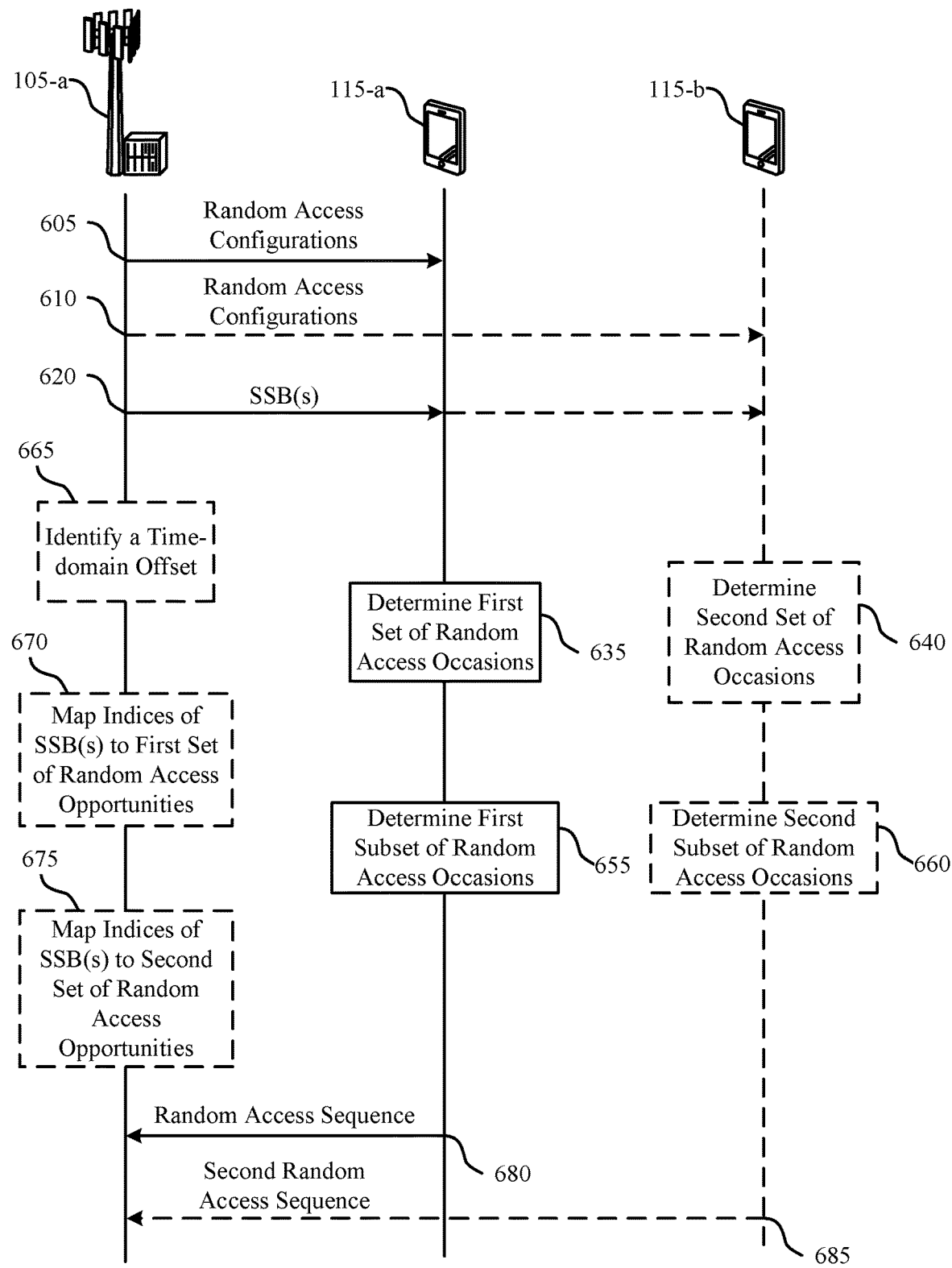
FIG. 6 illustrates an example of a process flow that supports association of SSBs with random access occasions in accordance with aspects of the present disclosure.

FIG. 6 illustrates an example of a process flow 600 that supports association of SSBs with random access occasions in accordance with aspects of the present disclosure. In some aspects, the process flow 600 may be implemented by aspects of the wireless communications system 100, as described with reference to FIG. 1. The process flow 600 may include a base station 105-a, a UE 115-a, and a UE 115-b, which may be examples of the corresponding devices described with reference to FIG. 1. The UE 115-a may be an example of a low-tier UE 115 that supports a first protocol type associated with a first set of capabilities (e.g., supporting NR-Light), and the UE 115-b may an example of a high-tier UE 115 that supports a second protocol type associated with a second set of capabilities (e.g., supporting eMBB or URLLC), although in other implementations, both UEs 115 may be low-tier UEs 115, both UEs 115 may be high-tier UEs 115, or any other like combination. Alternative examples of the following may be implemented, where some steps are performed in a different order than described or are not performed at all. In some cases, steps may include additional features not mentioned below, or further steps may be added.

At 605, the base station 105-a may transmit to the UE 115-a, and the UE 115-a may receive from the base station 105-a, one or more random access configurations (e.g., RACH configurations, as described herein). The one or more random access configurations may include, for example, a first random access configuration and a second random access configuration for the first protocol type. In some cases, the first random access configuration may indicate a first configuration period and a first set of random access opportunities for the first configuration period, and the second random access configuration may indicate a second configuration period and a second set of random access opportunities for the second configuration period.

At 610, the base station 105-a may transmit to the UE 115-b, and the UE 115-b may receive from the base station 105-a, one or more random access configurations (e.g., RACH configurations, as described herein). The one or more random access configurations may include, for example, a configuration period and a third set of random access opportunities (e.g., via PRACH configuration index) for the second protocol type. In some examples, the third set of random access opportunities may be the same as the first set of random access opportunities or the second set of random access opportunities.

At 620, the base station 105-a may transmit a set of SSBs (the set including, e.g., one or more SSB transmissions) to respective UEs 115, for example, the UE 115-a and the UE 115-b (among any additional UEs 115 within a coverage area of the base station 105-a). Correspondingly, the UE 115-a and the UE 115-b may receive respective SSBs of the set of the SSBs.

In some cases, each SSB of the set of SSBs may be associated with a different directional beam transmitted by the base station 105-a to each of the respective UEs 115 (e.g., at 620), for example, located in different directions with respect to the base station 105-a. Thus, for example, the base station 105-a may transmit a corresponding SSB to the UE 115-a using a first directional beam with first beam characteristics, and the base station 105-a may transmit a further corresponding SSB to the UE 115-b using a second directional beam with second beam characteristics.

At 635, the UE 115-a may determine a first set of random access occasions within a first association period based on the first random access configuration and the second random access configuration, as the UE 115-a may have received at 605. In some cases, the first association period may include one or more of the first and second configuration periods. In some cases, to determine the first set of random access occasions, the UE 115-a may determine the first association period based on mapping an integer multiple of the set of SSBs (e.g., as may have been communicated at 620) to the first set of random access opportunities and the second set of random access opportunities. In some cases, the first association period may be based on an integer number of a maximum value for the first configuration period or the second configuration period.

In some cases, determining the first set of random access occasions may include mapping indices of the plurality of SSBs to the first set of random access opportunities, the second set of random access opportunities, or both. In some cases, mapping the indices may include sequentially mapping indices of the set of SSBs to the first set of random access opportunities and the second set of random access opportunities. Additionally, or alternatively, mapping the indices may include independently mapping indices of the set of SSBs to the first set of random access opportunities and the second set of random access opportunities (e.g., according to one or more patterns independent of each other). Additionally, or alternatively, mapping the indices may include mapping an integer multiple of the set of SSBs to the first set of random access opportunities and the second set of random access opportunities.

In some cases, determining the one or more random access occasions ( ) may include identifying a time-domain offset for a first set of random access opportunities relative to a second set of random access opportunities within the first association period where, for example, the second set of random access opportunities may be associated with a random access configuration index of the first random access configuration or the second random access configuration, or both. In some cases, the first set of random access occasions may be time-division multiplexed with the second set of random access occasions over different sets of nonoverlapping time-domain resources.

At 640, as likewise described for the first UE 115-a at 635, the UE 115-b may determine a third set of random access occasions within a second association period based on the one or more random access configurations received at 610. In some cases, the third set of random access occasions may overlap in time with the first set of random access opportunities. That is, the first random access configuration and the third random access configuration may include the same configuration period and set of random access opportunities (e.g., PRACH configuration index). The first random access configuration and the third random access configuration may, however, configure different frequency resources for the random access occasions. In some cases, the second set of random access occasions may be based at least on the third random access configuration and at least one random access occasion of the second set of random access occasions overlaps in the time-domain with the first set of random access occasions.

In some cases, each random access occasion of the one or more (e.g., the first subset of) random access occasions (e.g., for a low-tier UE 115 such as the UE 115-a, as may be determined at 655) may be orthogonal (e.g., occupying non-overlapping sets of frequency-domain resources, time-domain resources, or both) to each random access occasion of a random access occasion or a second subset of random access occasions (e.g., for a high-tier UE 115 such as the UE 115-b, as may be determined at 660).

At 655, the UE 115-a may determine, from the first set of random access occasions, one or more (e.g., a first subset of) random access occasions associated with the SSB for the corresponding association period, for example, based on an index of the SSB. For example, as described with reference to FIGS. 2 through 5, the first set of random access occasions may include each of the occasions for the SSBs 1 through 4 from which the UE 115-a may determine the one or more (e.g., the first subset of) random access occasions, for example, for a particular SSB index.

At 665, the base station 105-a may identify a time-domain offset for the first set of random access opportunities (e.g., relative to the random access opportunities of the first random access configuration) within the association period.

At 670, the base station 105-*a* may map indices of the set of SSBs to the first set of random access opportunities (e.g., associated with the first protocol type). At 675, the base station 105-*a* may map indices of the set of SSBs to the second set of random access opportunities (e.g., associated with the second protocol type). In some cases, the base station 105-*a* may determine the association period, as similarly described herein, where, for example, the association period may include one or more of the first and second configuration periods. In some cases, the base station 105-*a* may determine the association period based on mapping an integer multiple of the set of SSBs (e.g., as may have been communicated at 620) to the first set of random access opportunities and the second set of random access opportunities. In some cases, the association period may be based on an integer number of a maximum value for the first configuration period or the second configuration period.

In some cases, mapping the indices may include sequentially mapping indices of the set of SSBs to the first set of random access opportunities and the second set of random access opportunities. Additionally, or alternatively, mapping the indices may include independently mapping indices of the set of SSBs to the first set of random access opportunities and the second set of random access opportunities (e.g., according to one or more patterns independent of each other). Additionally, or alternatively, mapping the indices may include mapping an integer multiple of the set of SSBs to the first set of random access opportunities and the second set of random access opportunities.

At 680, the UE 115-*a* may transmit to the base station 105-*a*, and the base station 105-*a* may receive from the UE 115-*a*, a first random access sequence over one or more of the one or more (e.g., the first subset of) random access occasions selected from the first set of random access opportunities (e.g., as the UE 115-*a* may have determined, or selected, at 655). In some cases, the UE 115-*a* may transmit one or more repetitions of the first random access sequence, for example, as illustrated with respect to FIGS. 3 through 5. In some cases, the base station 105-*a* may use the SSB mappings (e.g., as the base station 105-*a* may have performed at 670 and 675) to receive and process the first random access sequence.

At 685, the UE 115-*b* may transmit to the base station 105-*a*, and the base station 105-*a* may receive from the UE 115-*b*, a second random access sequence associated with a first SSB of the set of SSBs over a random access occasion (e.g., one or more of a second subset of random access occasions) of the second association period. In some cases, the random access occasion may be selected from the second set of random access opportunities based on an index of the first SSB (e.g., as the UE 115-*b* may have determined, or selected, at 660). In some cases, the base station 105-*a* may use the mappings (e.g., as the base station 105-*a* may have performed at 670 and 675) to receive and process the second random access sequence.

Figure 7:
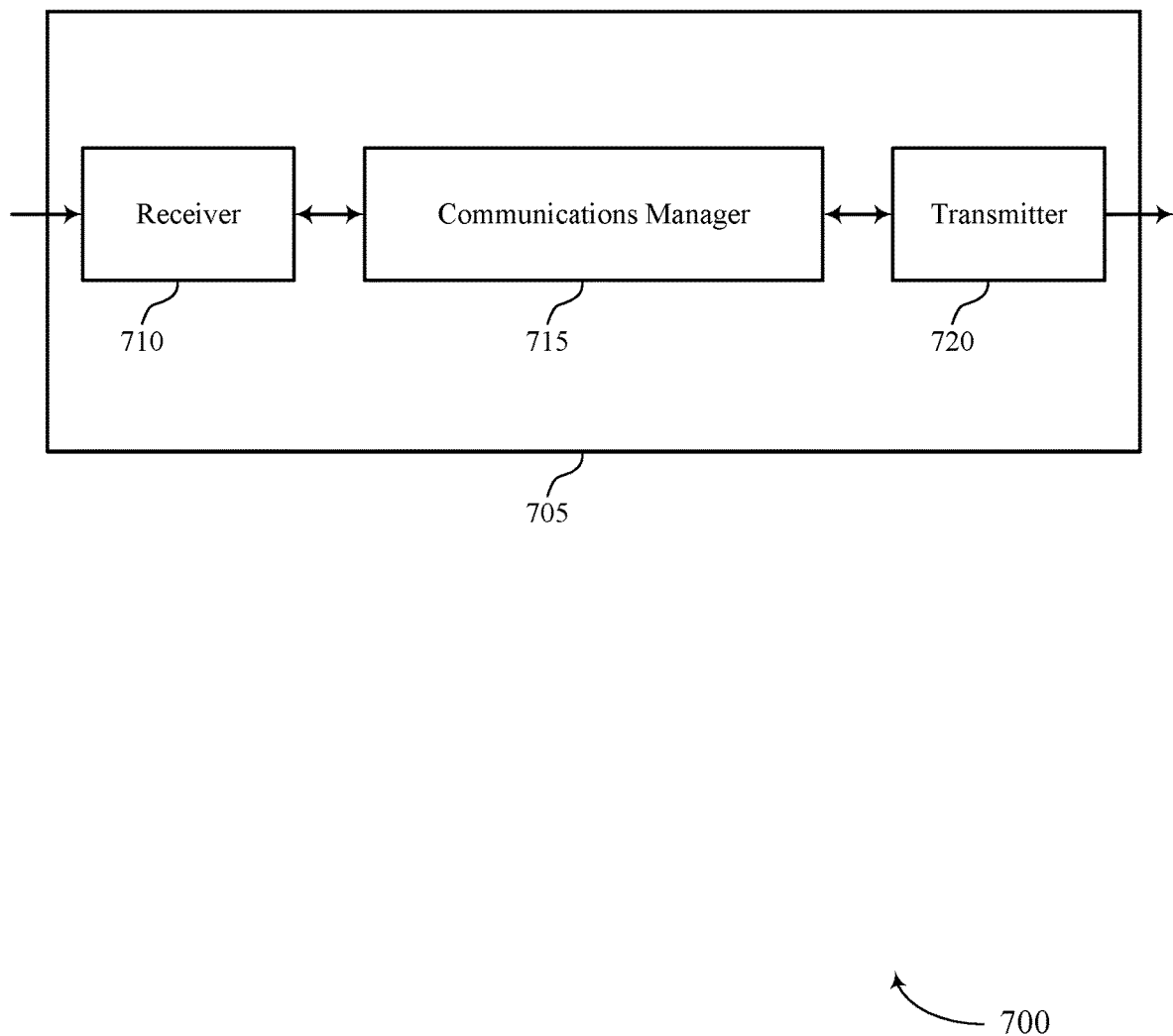
FIGS. 7 and 8 show block diagrams of devices that support association of SSBs with random access occasions in accordance with aspects of the present disclosure.

FIG. 7 shows a block diagram 700 of a device 705 that supports association of SSBs to random access occasions in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to association of SSBs to random access occasions, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive, from a base station, a first random access configuration and a second random access configuration, receive a SSB of a set of SSBs transmitted by the base station, determine a first set of random access occasions within an association period based on the first random access configuration and the second random access configuration, map indices of the set of SSBs to one or more random access occasions of the first set of random access occasions within the association period, and transmit, to the base station, a random access sequence and one or more repetitions of the random access sequence using the one or more random access occasions associated with the SSB for the association period. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
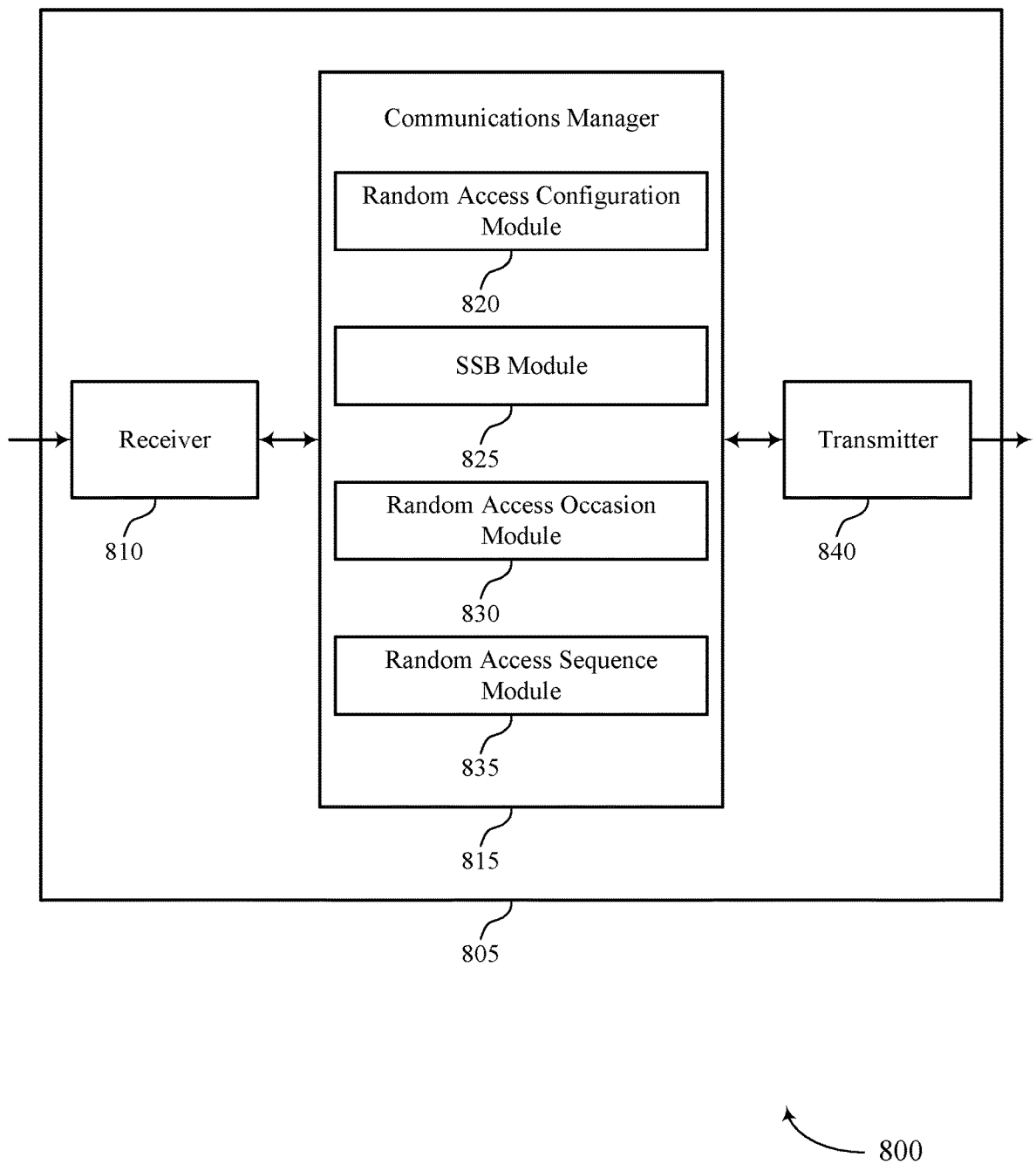

FIG. 8 shows a block diagram 800 of a device 805 that supports association of SSBs to random access occasions in accordance with aspects of the present disclosure. The device 805 may be an example of aspects of a device 705, or a UE 115 as described herein. The device 805 may include a receiver 810, a communications manager 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to association of SSBs to random access occasions, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a random access configuration module 820, a SSB module 825, a random access occasion module 830, and a random access sequence module 835. The communications manager 815 may be an example of aspects of the communications manager 1010 described herein.

The random access configuration module 820 may receive, from a base station, a first random access configuration and a second random access configuration.

The SSB module 825 may receive a SSB of a set of SSBs transmitted by the base station.

The random access occasion module 830 may determine a first set of random access occasions within an association period based on the first random access configuration and the second random access configuration and map indices of the set of SSBs to one or more random access occasions of the first set of random access occasions within the association period.

The random access sequence module 835 may transmit, to the base station, a random access sequence and one or more repetitions of the random access sequence using the one or more (e.g., the first subset of) random access occasions associated with the SSB for the association period.

The transmitter 840 may transmit signals generated by other components of the device 805. In some examples, the transmitter 840 may be collocated with a receiver 810 in a transceiver module. For example, the transmitter 840 may be an example of aspects of the transceiver 1020 described with reference to FIG. 10. The transmitter 840 may utilize a single antenna or a set of antennas.

Figure 9:
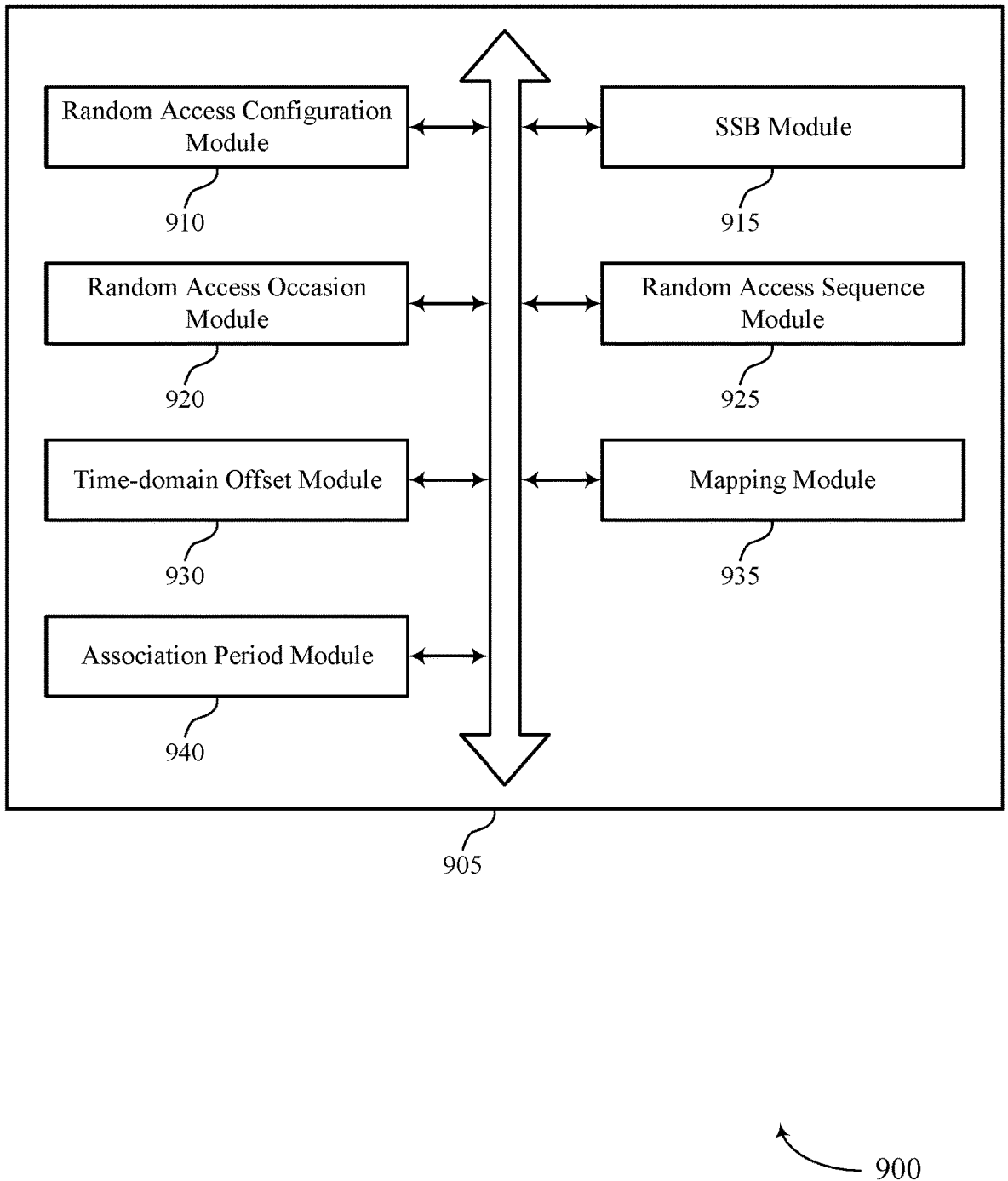
FIG. 9 shows a block diagram of a communications manager that supports association of SSBs with random access occasions in accordance with aspects of the present disclosure.

FIG. 9 shows a block diagram 900 of a communications manager 905 that supports association of SSBs to random access occasions in accordance with aspects of the present disclosure. The communications manager 905 may be an example of aspects of a communications manager 715, a communications manager 815, or a communications manager 1010 described herein. The communications manager 905 may include a random access configuration module 910, a SSB module 915, a random access occasion module 920, a random access sequence module 925, a mapping module 930, and an association period module 935. Each of these modules may communicate, directly or indirectly, with one another (e.g., via one or more buses).

The random access configuration module 910 may receive, from a base station, a first random access configuration and a second random access configuration.

The SSB module 915 may receive a SSB of a set of SSBs transmitted by the base station. In some cases, each of the set of SSBs is associated with a different directional beam transmitted by the base station.

The random access occasion module 920 may determine a first set of random access occasions within an association period based on the first random access configuration and the second random access configuration. In some examples, the random access occasion module 920 may map indices of the set of SSBs to one or more random access occasions of the first set of random access occasions within the association period. In some cases, the first random access configuration indicates a first configuration period and a first set of random access opportunities for the first configuration period, and the second random access configuration indicates a second configuration period and a second set of random access opportunities for the second configuration period, and where determining the first set of random access occasions includes mapping indices of the set of SSBs to the first set of random access opportunities and the second set of random access opportunities. In some cases, the first set of random access occasions are time-division multiplexed with the second set of random access occasions over different sets of nonoverlapping time-domain resources.

The random access sequence module 925 may transmit, to the base station, a random access sequence and one or more repetitions of the random access sequence using the one or more (e.g., the first subset of) random access occasions associated with the SSB for the association period.

The mapping module 930 may identify a time-domain offset for the first set of random access opportunities relative to the second set of random access opportunities within the association period, where the second set of random access opportunities is associated with a random access configuration index of the first random access configuration or the second random access configuration, or both, where determining the first set of random access occasions may include mapping indices of the set of SSBs to the first set of random access opportunities.

In some examples, the mapping module 930 may map indices of the set of SSBs to the first set of random access opportunities. In some examples, the mapping module 930 may sequentially map indices of the set of SSBs to the first set of random access opportunities and the second set of random access opportunities. In some examples, the mapping module 930 may independently map indices of the set of SSBs to the first set of random access opportunities and the second set of random access opportunities. In some examples, the mapping module 930 may map an integer multiple of the set of SSBs to the first set of random access opportunities and the second set of random access opportunities.

The association period module 935 may determine the association period based on mapping an integer multiple of the set of SSBs to the first set of random access opportunities and the second set of random access opportunities. In some cases, the association period is based on an integer number of a maximum value for the first configuration period or the second configuration period.

Figure 10:
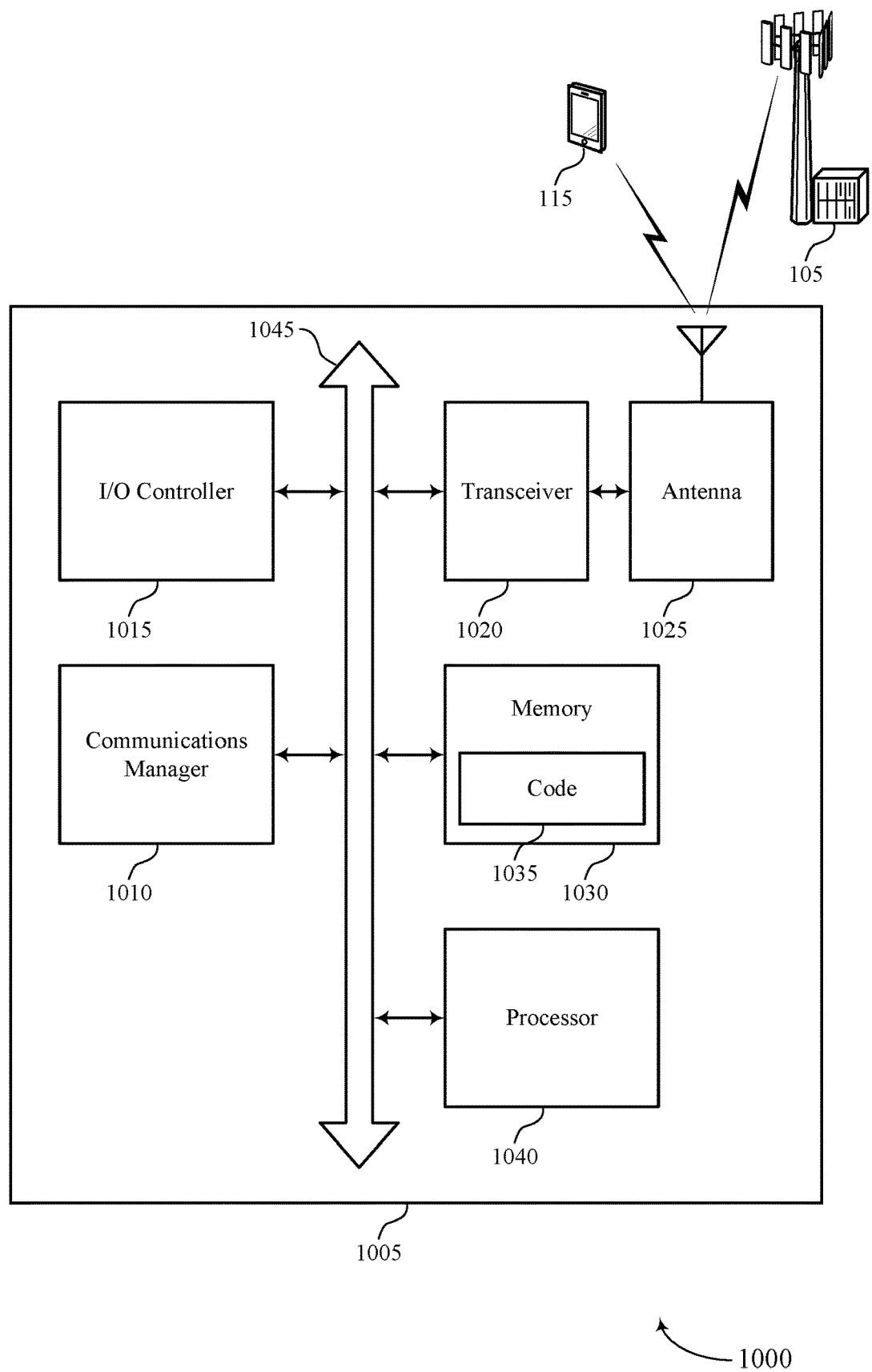
FIG. 10 shows a diagram of a system including a device that supports association of SSBs with random access occasions in accordance with aspects of the present disclosure.

FIG. 10 shows a diagram of a system 1000 including a device 1005 that supports association of SSBs to random access occasions in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive, from a base station, a first random access configuration and a second random access configuration, receive a SSB of a set of SSBs transmitted by the base station, determine a first set of random access occasions within an association period based on the first random access configuration and the second random access configuration, map indices of the set of SSBs to one or more random access occasions of the first set of random access occasions within the association period, and transmit, to the base station, a random access sequence and one or more repetitions of the random access sequence using the one or more (e.g., the first subset of) random access occasions associated with the SSB for the association period.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic input/output system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting association of SSBs to random access occasions).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
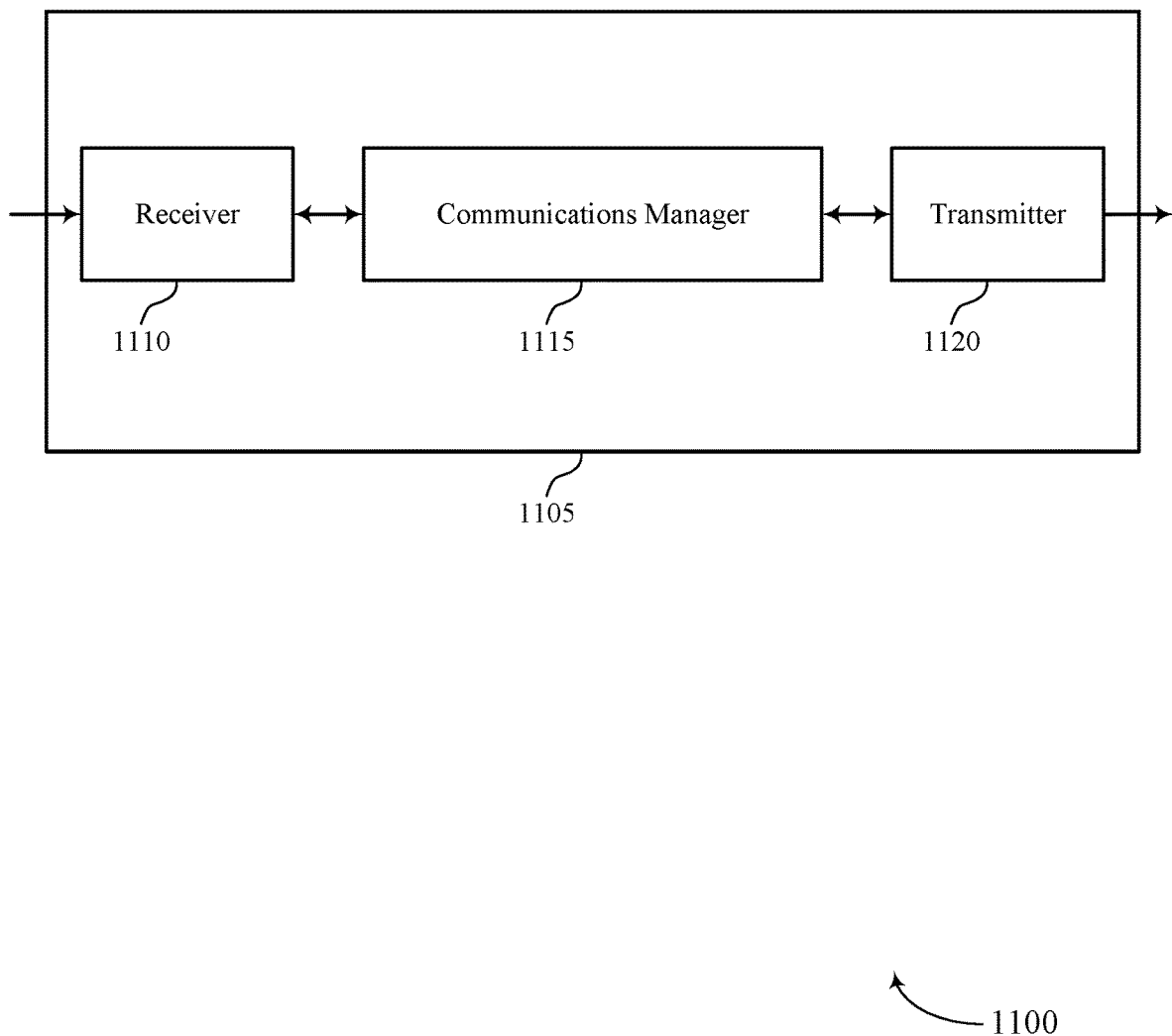
FIGS. 11 and 12 show block diagrams of devices that support association of SSBs with random access occasions in accordance with aspects of the present disclosure.

FIG. 11 shows a block diagram 1100 of a device 1105 that supports association of SSBs to random access occasions in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to association of SSBs to random access occasions, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may transmit, to a first UE associated with a first protocol type, a first random access configuration and a second random access configuration, transmit a set of SSBs, map one or more indices of the set of SSBs to a first set of random access occasions of a first association period, where the first set of random access occasions is based at least in part on the first random access configuration and the second random access configuration, and receive, from the first UE, a first random access sequence and one or more repetitions of the first random access sequence associated with a first SSB of the set of SSBs over one or more (e.g., a first subset of) random access occasions of a first association period, the one or more random access occasions selected from a first set of random access occasions based on an index of the first synchronization signal block, where the first set of random access occasions is based on the first random access configuration and the second random access configuration. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
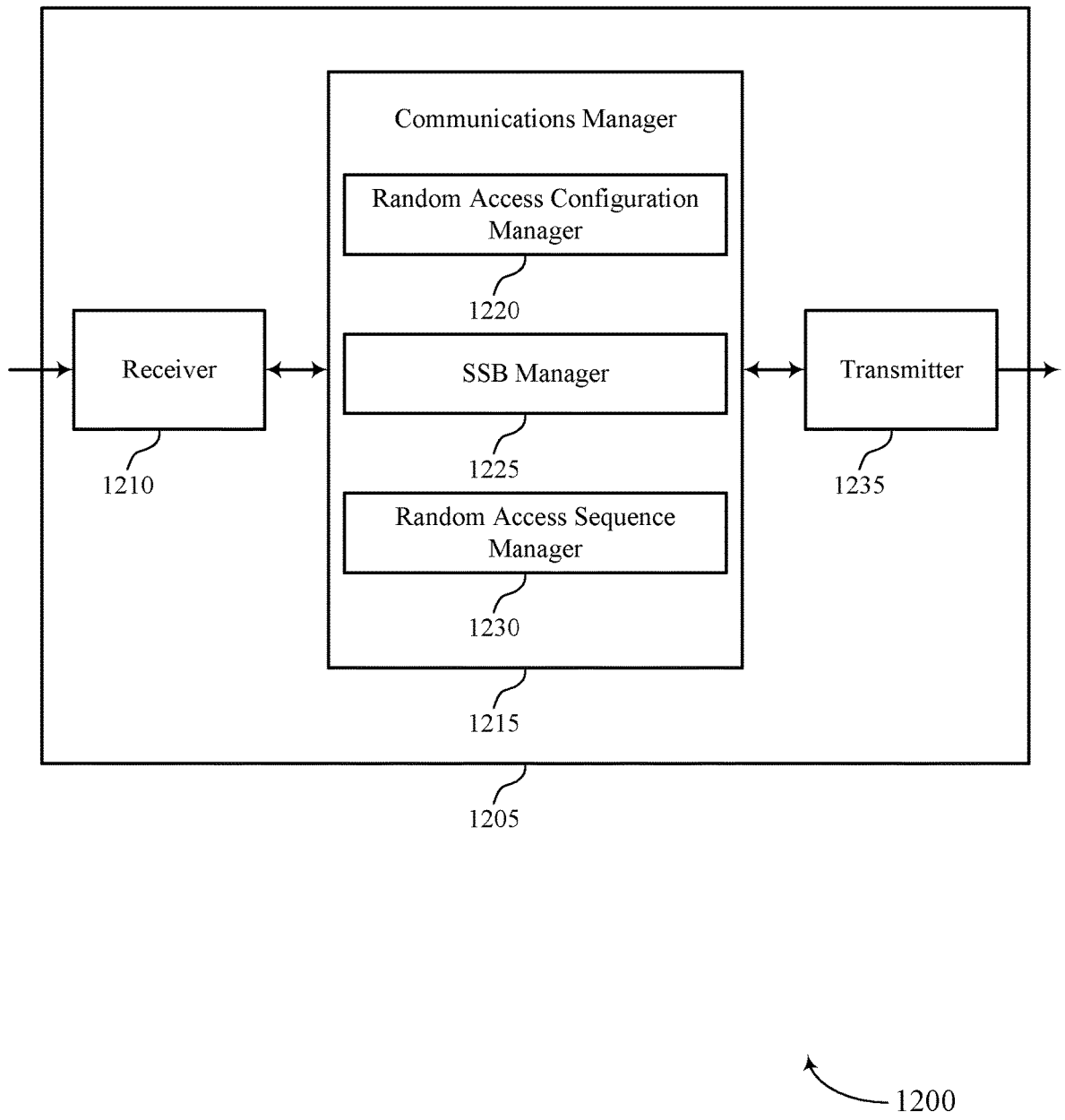

FIG. 12 shows a block diagram 1200 of a device 1205 that supports association of SSBs to random access occasions in accordance with aspects of the present disclosure. The device 1205 may be an example of aspects of a device 1105, or a base station 105 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to association of SSBs to random access occasions, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a random access configuration manager 1220, a SSB manager 1225, and a random access sequence manager 1230. The communications manager 1215 may be an example of aspects of the communications manager 1410 described herein.

The random access configuration manager 1220 may transmit, to a first UE associated with a first protocol type, a first random access configuration and a second random access configuration.

The SSB manager 1225 may transmit a set of SSBs.

The random access sequence manager 1230 may map one or more indices of the set of SSBs to a first set of random access occasions of a first association period, where the first set of random access occasions is based at least in part on the first random access configuration and the second random access configuration. The random access sequence manager 1230 may receive, from the first UE, a first random access sequence and one or more repetitions of the first random access sequence associated with a first SSB of the set of SSBs over one or more (e.g., a first subset of) random access occasions of a first association period, the one or more random access occasions selected from a first set of random access occasions based on an index of the first synchronization signal block, where the first set of random access occasions is based on the first random access configuration and the second random access configuration.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
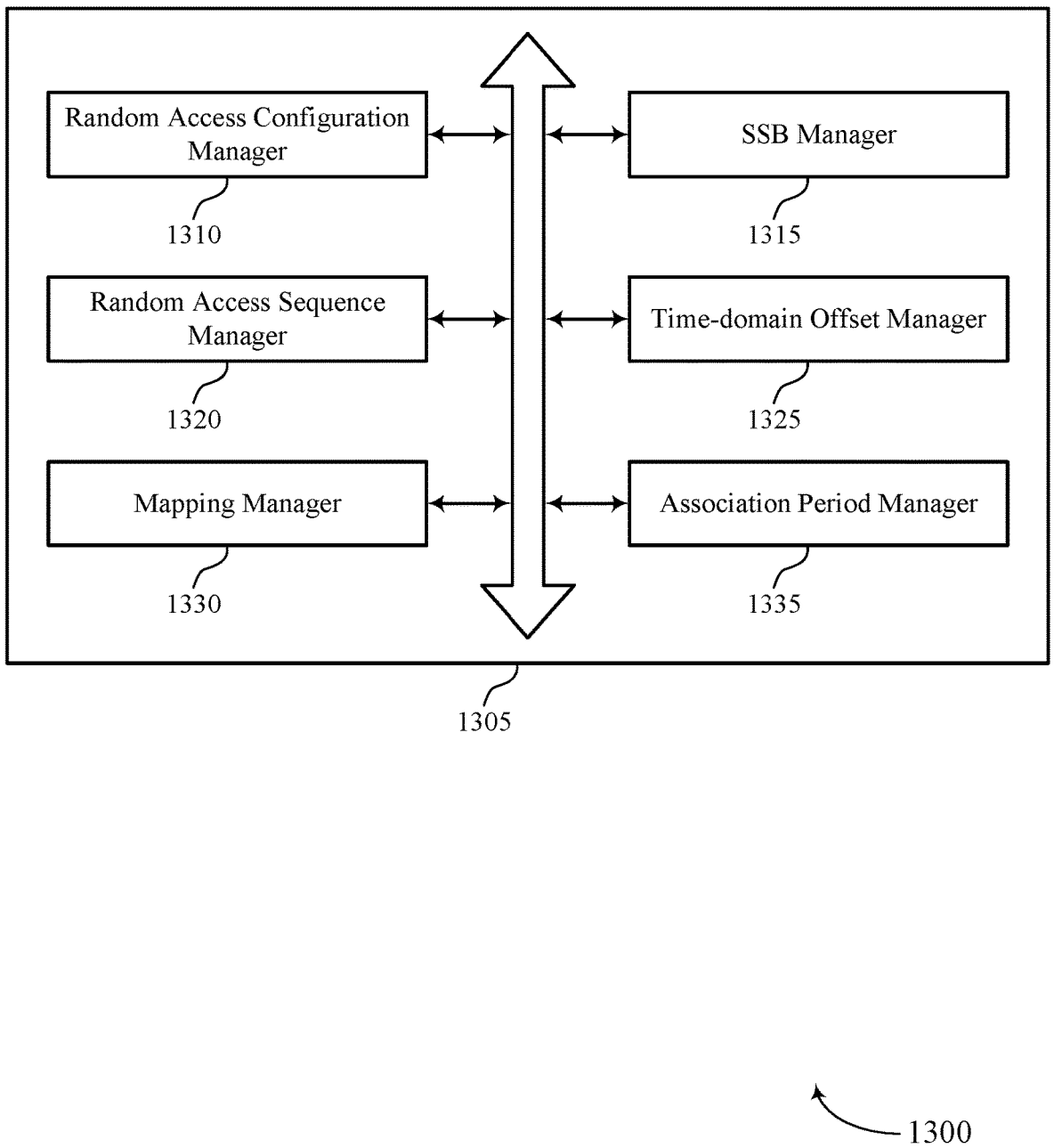
FIG. 13 shows a block diagram of a communications manager that supports association of SSBs with random access occasions in accordance with aspects of the present disclosure.

FIG. 13 shows a block diagram 1300 of a communications manager 1305 that supports association of SSBs to random access occasions in accordance with aspects of the present disclosure. The communications manager 1305 may be an example of aspects of a communications manager 1115, a communications manager 1215, or a communications manager 1410 described herein. The communications manager 1305 may include a random access configuration manager 1310, a SSB manager 1315, a random access sequence manager 1320, a time-domain offset manager 1325, a mapping manager 1330, and an association period manager 1335. Each of these modules may communicate, directly or indirectly, with one another (e.g., via one or more buses).

The random access configuration manager 1310 may transmit, to a first UE associated with a first protocol type, a first random access configuration and a second random access configuration. In some examples, the random access configuration manager 1310 may transmit, to a second UE associated with a second protocol type, a third random access configuration.

The SSB manager 1315 may transmit a set of SSBs. In some examples, the SSB manager 1315 may transmit each of the set of SSBs with a different directional beam.

The random access sequence manager 1320 may map one or more indices of the set of SSBs to a first set of random access occasions of a first association period, where the first set of random access occasions is based at least in part on the first random access configuration and the second random access configuration. The random access sequence manager 1320 may receive, from the first UE, a first random access sequence and one or more repetitions of the first random access sequence associated with a first SSB of the set of SSBs over one or more (e.g., a first subset of) random access occasions of a first association period, the one or more random access occasions selected from a first set of random access occasions based on an index of the first synchronization signal block, where the first set of random access occasions is based on the first random access configuration and the second random access configuration. The random access sequence manager 1320 may further receive, from the second UE, a second random access sequence associated with the first SSB over a random access occasion (e.g., one or more of a second subset of random access occasions) of a second association period, the random access occasion selected from a second set of random access occasions based on an index of the first SSB, where the second set of random access occasions is based on the third random access configuration.

In some examples, the one or more random access occasions over which the first random access sequence is received from the first UE associated with the first protocol type is frequency-division multiplexed with the random access occasion (e.g., one or more of a second subset of random access occasions) over which the second random access sequence is received from the second UE associated with the second protocol type. In some examples, the first random access sequence received from the first UE and the second random access sequence received from the second UE are associated with the first SSB. In some cases, the one or more random access occasions is frequency-division multiplexed with the random access occasion (e.g., one or more of the second subset of random access occasions). In some cases, the first protocol type is associated with a first set of UE capabilities and the second protocol type is associated with a second set of UE capabilities.

The time-domain offset manager 1325 may identify a time-domain offset for a first set of random access opportunities relative to a second set of random access opportunities within the first association period, where the first set of random access opportunities is associated with the first protocol type and the second set of random access opportunities is associated with the second protocol type.

The mapping manager 1330 may map indices of the set of SSBs to the first set of random access opportunities associated with the first protocol type. In some examples, the mapping manager 1330 may map indices of the set of SSBs to the second set of random access opportunities associated with the second protocol type. In some examples, the mapping manager 1330 may sequentially map the indices of the set of SSBs to the first set of random access opportunities and the second set of random access opportunities. In some examples, the mapping manager 1330 may independently map the indices of the set of SSBs to the first set of random access opportunities and the second set of random access opportunities. In some examples, the mapping manager 1330 may map an integer multiple of the set of SSBs to the first set of random access opportunities and the second set of random access opportunities.

In some examples, the first set of random access opportunities are time-division multiplexed with the second set of random access opportunities over different sets of nonoverlapping time-domain resources.

The association period manager 1335 may determine the association period based on mapping an integer multiple of the set of SSBs to the first set of random access opportunities and the second set of random access opportunities. In some cases, the first random access configuration indicates a first configuration period and a first set of random access opportunities for the first configuration period, and the second random access configuration indicates a second configuration period and a second set of random access opportunities for the second configuration period, where indices of the set of SSBs may be mapped to the first set of random access opportunities and the second set of random access opportunities. In some cases, the association period is based on an integer number of a maximum value for the first configuration period or the second configuration period.

Figure 14:
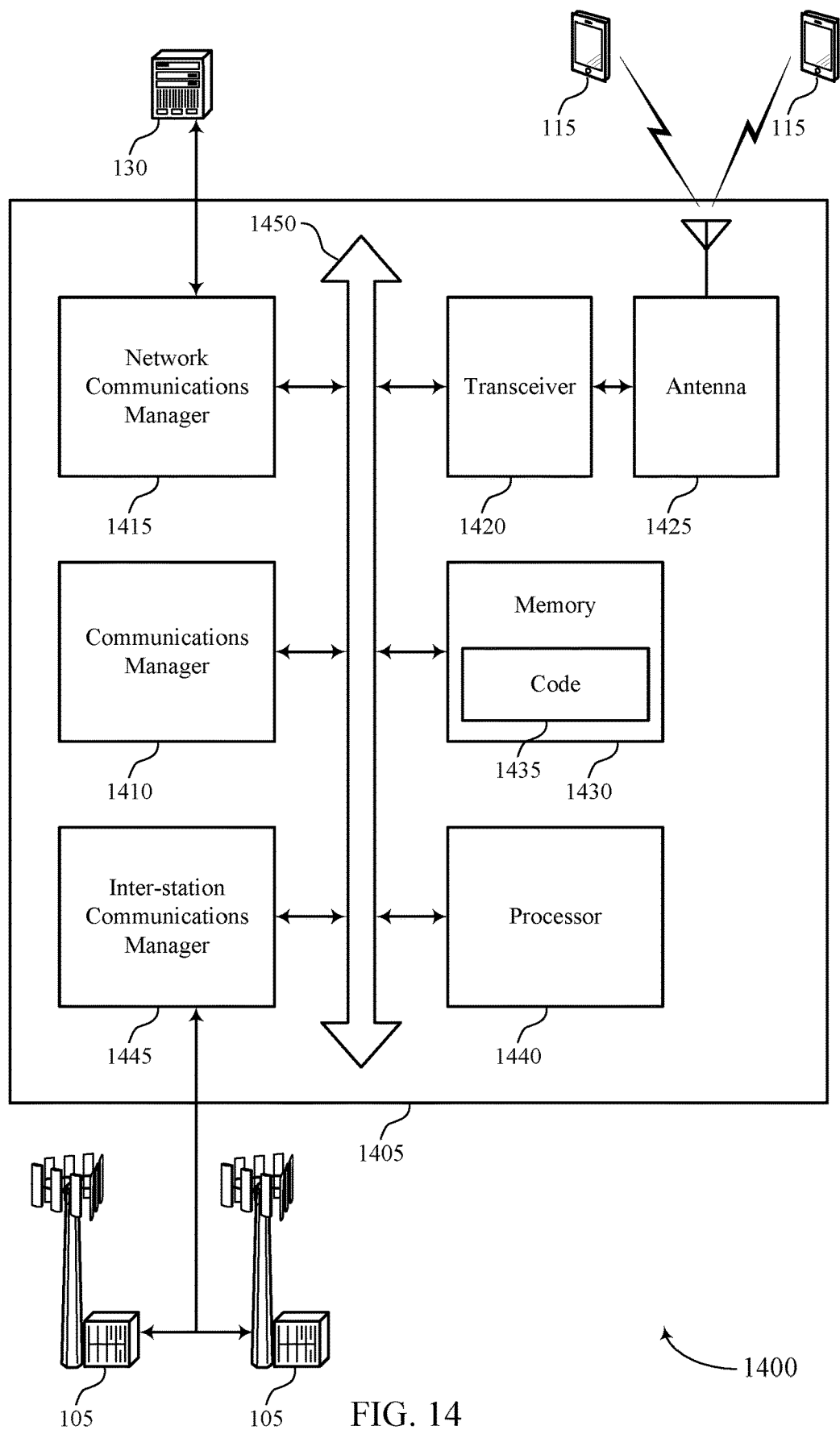
FIG. 14 shows a diagram of a system including a device that supports association of SSBs with random access occasions in accordance with aspects of the present disclosure.

FIG. 14 shows a diagram of a system 1400 including a device 1405 that supports association of SSBs to random access occasions in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may transmit, to a first UE associated with a first protocol type, a first random access configuration and a second random access configuration, transmit a set of SSBs, map one or more indices of the set of SSBs to a first set of random access occasions of a first association period, where the first set of random access occasions is based at least in part on the first random access configuration and the second random access configuration, and receive, from the first UE, a first random access sequence and one or more repetitions of the first random access sequence associated with a first SSB of the set of SSBs over one or more (e.g., a first subset of) random access occasions of a first association period, the one or more random access occasions selected from a first set of random access occasions based on an index of the first synchronization signal block, where the first set of random access occasions is based on the first random access configuration and the second random access configuration.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting association of SSBs to random access occasions).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
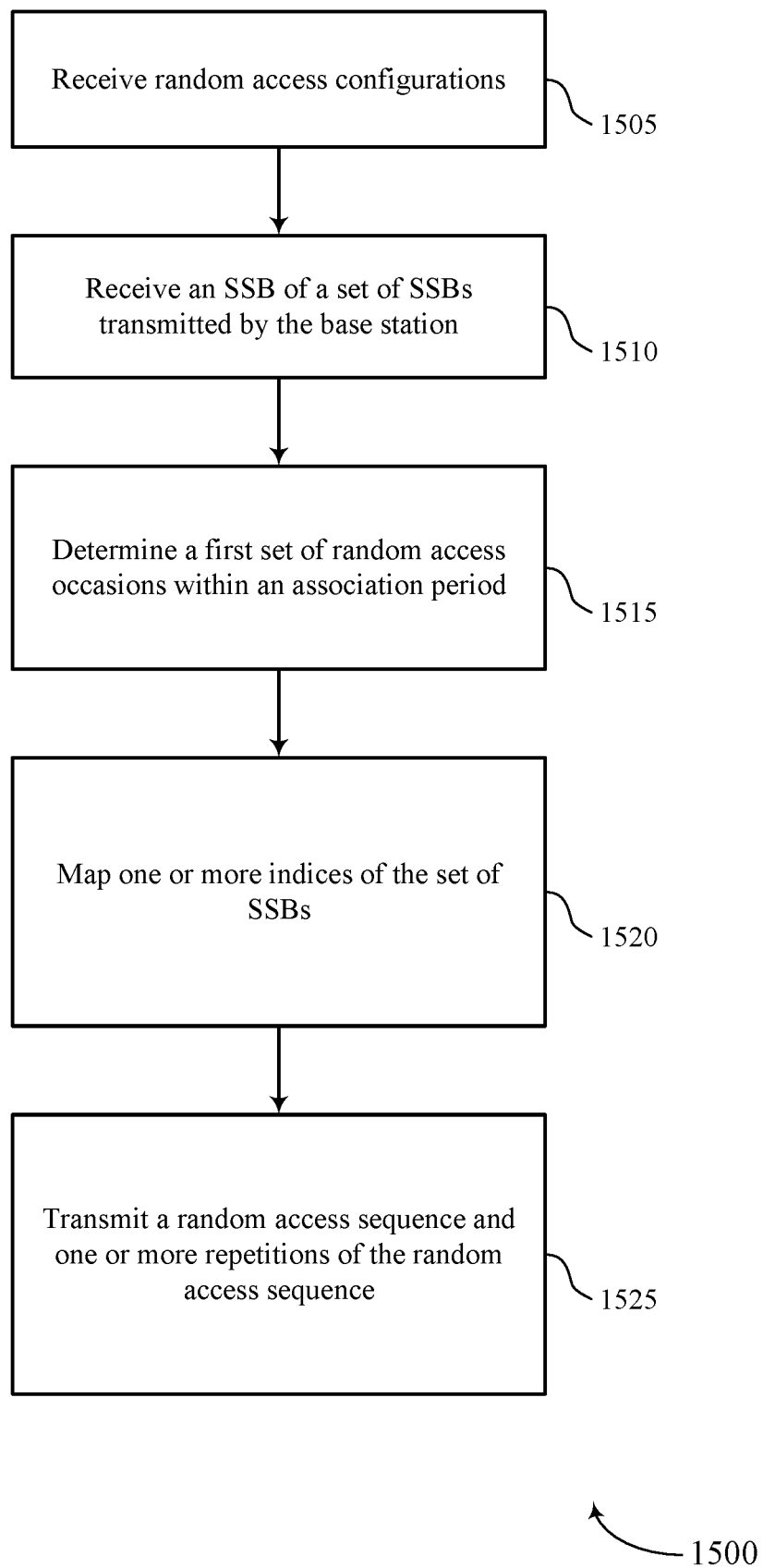
FIGS. 15 through 19 show flowcharts illustrating methods that support association of SSBs with random access occasions in accordance with aspects of the present disclosure.

FIG. 15 shows a flowchart illustrating a method 1500 that supports association of SSBs to random access occasions in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally, or alternatively, a UE may perform aspects of the functions described below using special-purpose hardware.

At 1505, the UE may receive random access configurations. For example, the UE may receive, from a base station, a first random access configuration and a second random access configuration. The operations of 1505 may be performed according to the methods described herein. In some examples, aspects of the operations of 1505 may be performed by a random access configuration module as described with reference to FIGS. 7 through 10.

At 1510, the UE may receive a SSB of a set of SSBs transmitted by the base station. The operations of 1510 may be performed according to the methods described herein. In some examples, aspects of the operations of 1510 may be performed by a SSB module as described with reference to FIGS. 7 through 10.

At 1515, the UE may determine a first set of random access occasions within an association period. For example, the UE may determine a first set of random access occasions within an association period based on the first random access configuration and the second random access configuration. The operations of 1515 may be performed according to the methods described herein. In some examples, aspects of the operations of 1515 may be performed by a random access occasion module as described with reference to FIGS. 7 through 10.

At 1520, the UE may map one or more indices of the set of SSBs. For example, the UE may map one or more indices of the set of SSBs to one or more random access occasions of the first set of random access occasions within the association period. The operations of 1520 may be performed according to the methods described herein. In some examples, aspects of the operations of 1520 may be performed by a random access occasion module as described with reference to FIGS. 7 through 10.

At 1525, the UE may transmit a random access sequence and one or more repetitions of the random access sequence. For example, the UE may transmit, to the base station, a random access sequence and one or more repetitions of the random access sequence using the one or more random access occasions associated with the SSB for the association period. The operations of 1525 may be performed according to the methods described herein. In some examples, aspects of the operations of 1525 may be performed by a random access sequence module as described with reference to FIGS. 7 through 10.

Figure 16:
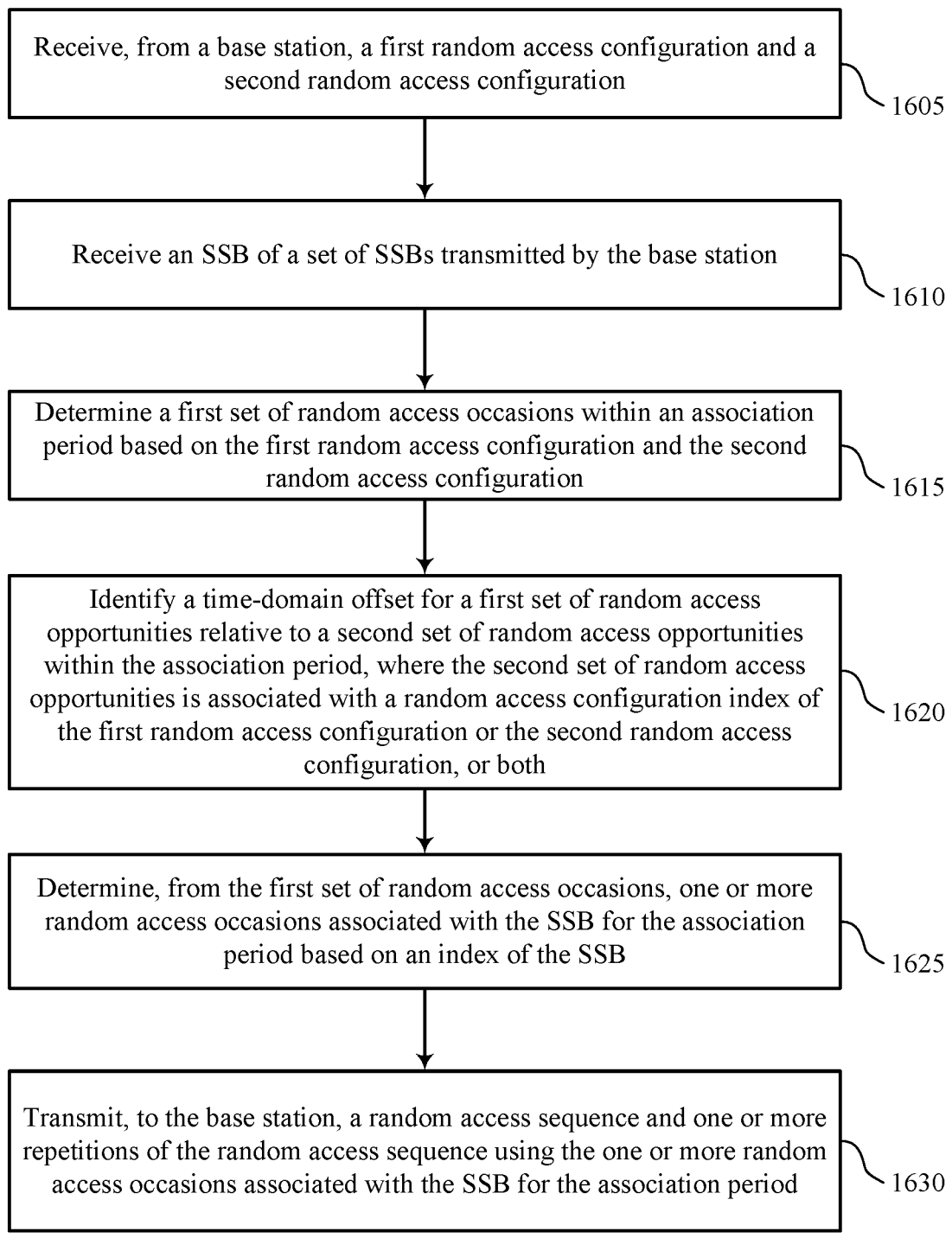

FIG. 16 shows a flowchart illustrating a method 1600 that supports association of SSBs to random access occasions in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally, or alternatively, a UE may perform aspects of the functions described below using special-purpose hardware.

At 1605, the UE may receive, from a base station, a first random access configuration and a second random access configuration. The operations of 1605 may be performed according to the methods described herein. In some examples, aspects of the operations of 1605 may be performed by a random access configuration module as described with reference to FIGS. 7 through 10.

At 1610, the UE may receive a SSB of a set of SSBs transmitted by the base station. The operations of 1610 may be performed according to the methods described herein. In some examples, aspects of the operations of 1610 may be performed by a SSB module as described with reference to FIGS. 7 through 10.

At 1615, the UE may determine a first set of random access occasions within an association period based on the first random access configuration and the second random access configuration. The operations of 1615 may be performed according to the methods described herein. In some examples, aspects of the operations of 1615 may be performed by a random access occasion module as described with reference to FIGS. 7 through 10.

At 1620, the UE may identify a time-domain offset for a first set of random access opportunities relative to a second set of random access opportunities within the association period, where the second set of random access opportunities may be associated with a random access configuration index of the first random access configuration or the second random access configuration, or both. The operations of 1620 may be performed according to the methods described herein. In some examples, aspects of the operations of 1620 may be performed by a mapping module as described with reference to FIGS. 7 through 10.

At 1625, the UE may determine, from the first set of random access occasions, one or more random access occasions associated with the SSB for the association period based on an index of the SSB. The operations of 1625 may be performed according to the methods described herein. In some examples, aspects of the operations of 1625 may be performed by a random access occasion module as described with reference to FIGS. 7 through 10.

At 1630, the UE may transmit, to the base station, a random access sequence and one or more repetitions of the random access sequence using the one or more of random access occasions associated with the SSB for the association period. The operations of 1630 may be performed according to the methods described herein. In some examples, aspects of the operations of 1630 may be performed by a random access sequence module as described with reference to FIGS. 7 through 10.

Figure 17:
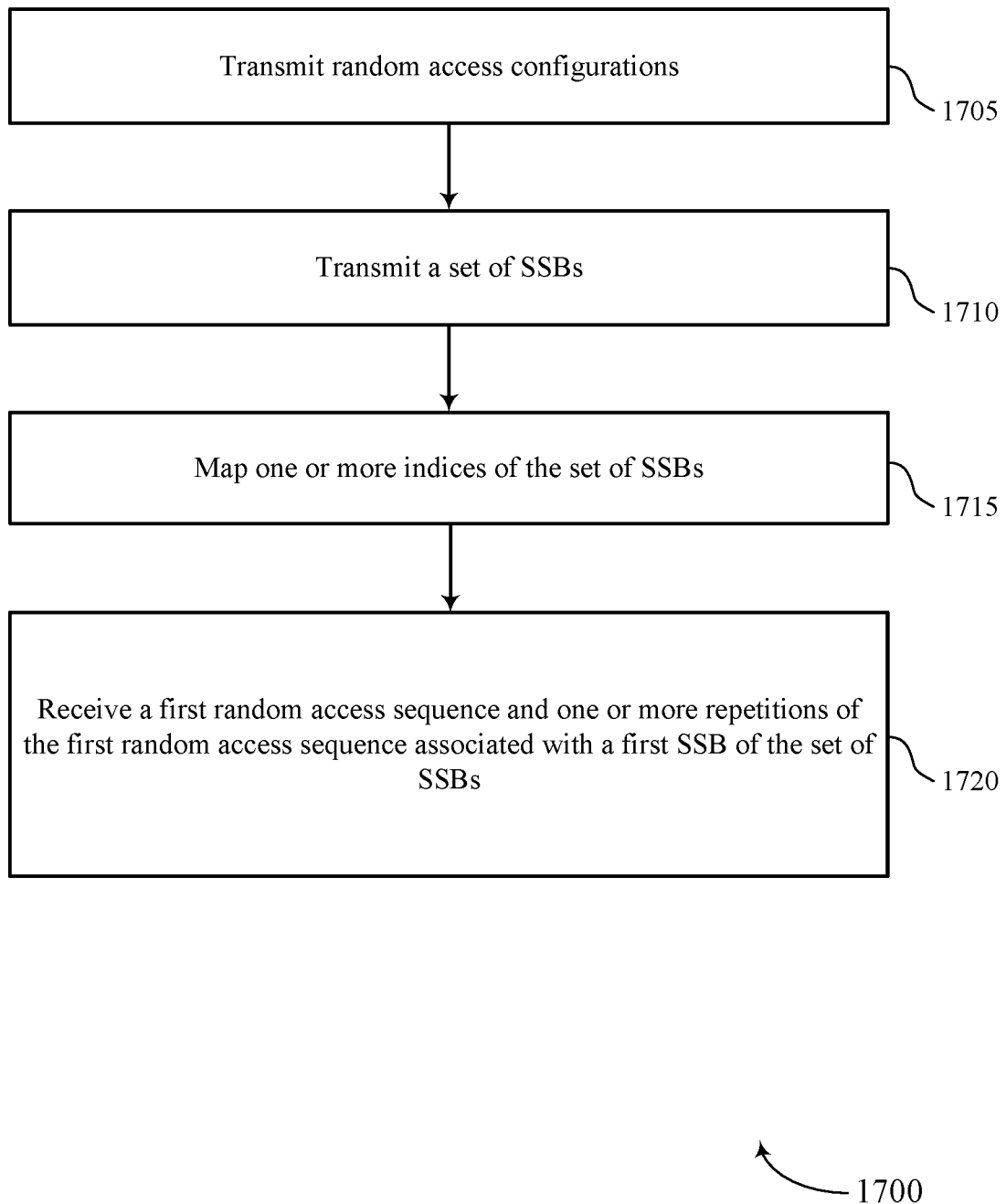

FIG. 17 shows a flowchart illustrating a method 1700 that supports association of SSBs to random access occasions in accordance with aspects of the present disclosure. The operations of method 1700 may be implemented by a base station 105 or its components as described herein. For example, the operations of method 1700 may be performed by a communications manager as described with reference to FIGS. 11 through 14. In some examples, a base station may execute a set of instructions to control the functional elements of the base station to perform the functions described below. Additionally, or alternatively, a base station may perform aspects of the functions described below using special-purpose hardware.

At 1705, the base station may transmit random access configurations. For example, the base station may transmit, to a first UE associated with a first protocol type, a first random access configuration and a second random access configuration. The operations of 1705 may be performed according to the methods described herein. In some examples, aspects of the operations of 1705 may be performed by a random access configuration manager as described with reference to FIGS. 11 through 14.

At 1710, the base station may transmit a set of SSBs. The operations of 1710 may be performed according to the methods described herein. In some examples, aspects of the operations of 1710 may be performed by a SSB manager as described with reference to FIGS. 11 through 14.

At 1715, the base station may map one or more indices of the set of SSBs. For example, the base station may map one or more indices of the set of SSBs to a first set of random access occasions of a first association period, where the first set of random access occasions is based at least in part on the first random access configuration and the second random access configuration. The operations of 1715 may be performed according to the methods described herein. In some examples, aspects of the operations of 1715 may be performed by a random access sequence manager as described with reference to FIGS. 11 through 14.

At 1720, the base station may receive a first random access sequence and one or more repetitions of the first random access sequence associated with a first SSB of the set of SSBs. For example, the base station may receive, from the first UE, a first random access sequence and one or more repetitions of the first random access sequence associated with a first SSB of the set of SSBs over one or more (e.g., a first subset of) random access occasions of a first association period, the one or more random access occasions selected from a first set of random access occasions based on an index of the first synchronization signal block, where the first set of random access occasions may be based on the first random access configuration and the second random access configuration. The operations of 1720 may be performed according to the methods described herein. In some examples, aspects of the operations of 1720 may be performed by a random access sequence manager as described with reference to FIGS. 11 through 14.

Figure 18:
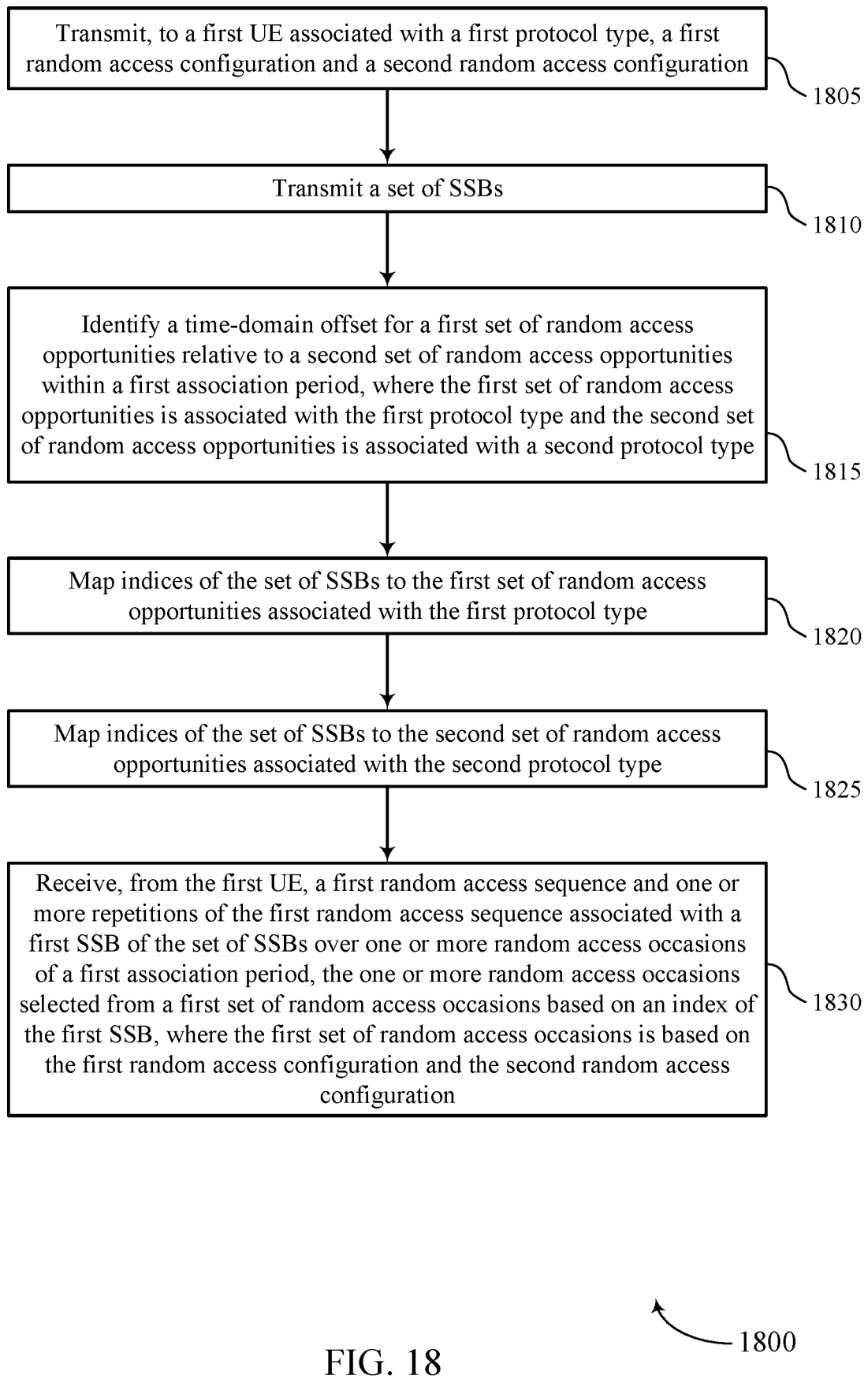

FIG. 18 shows a flowchart illustrating a method 1800 that supports association of SSBs to random access occasions in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described below. Additionally, or alternatively, a base station may perform aspects of the functions described below using special-purpose hardware.

At 1805, the base station may transmit, to a first UE associated with a first protocol type, a first random access configuration and a second random access configuration. The operations of 1805 may be performed according to the methods described herein. In some examples, aspects of the operations of 1805 may be performed by a random access configuration manager as described with reference to FIGS. 11 through 14.

At 1810, the base station may transmit a set of SSBs. The operations of 1810 may be performed according to the methods described herein. In some examples, aspects of the operations of 1810 may be performed by a SSB manager as described with reference to FIGS. 11 through 14.

At 1815, the base station may identify a time-domain offset for a first set of random access opportunities relative to a second set of random access opportunities within a first association period, where the first set of random access opportunities may be associated with the first protocol type and the second set of random access opportunities may be associated with a second protocol type. The operations of 1815 may be performed according to the methods described herein. In some examples, aspects of the operations of 1815 may be performed by a time-domain offset manager as described with reference to FIGS. 11 through 14.

At 1820, the base station may map indices of the set of SSBs to the first set of random access opportunities associated with the first protocol type. The operations of 1820 may be performed according to the methods described herein. In some examples, aspects of the operations of 1820 may be performed by a mapping manager as described with reference to FIGS. 11 through 14.

At 1825, the base station may map indices of the set of SSBs to the second set of random access opportunities associated with the second protocol type. The operations of 1825 may be performed according to the methods described herein. In some examples, aspects of the operations of 1825 may be performed by a mapping manager as described with reference to FIGS. 11 through 14.

At 1830, the base station may receive, from the first UE, a first random access sequence and one or more repetitions of the first random access sequence associated with a first SSB of the set of SSBs over one or more (e.g., a first subset of) random access occasions of a first association period, the one or more random access occasions selected from a first set of random access occasions based on an index of the first synchronization signal block, where the first set of random access occasions may be based on the first random access configuration and the second random access configuration. The operations of 1815 may be performed according to the methods described herein. In some examples, aspects of the operations of 1815 may be performed by a random access sequence manager as described with reference to FIGS. 11 through 14.

Figure 19:
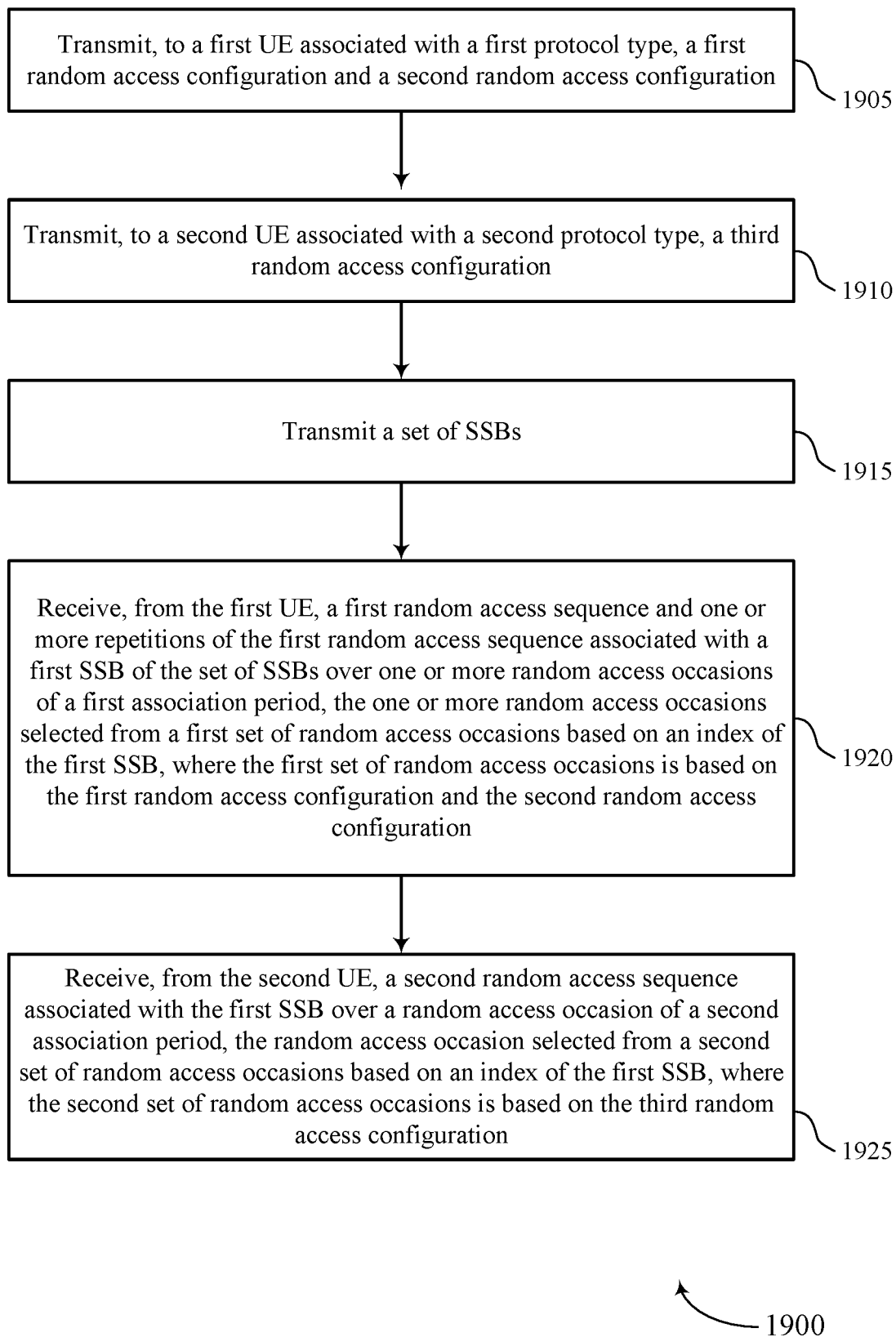

FIG. 19 shows a flowchart illustrating a method 1900 that supports association of SSBs to random access occasions in accordance with aspects of the present disclosure. The operations of method 1900 may be implemented by a base station 105 or its components as described herein. For example, the operations of method 1900 may be performed by a communications manager as described with reference to FIGS. 11 through 14. In some examples, a base station may execute a set of instructions to control the functional elements of the base station to perform the functions described below. Additionally, or alternatively, a base station may perform aspects of the functions described below using special-purpose hardware.

At 1905, the base station may transmit, to a first UE associated with a first protocol type, a first random access configuration and a second random access configuration. The operations of 1905 may be performed according to the methods described herein. In some examples, aspects of the operations of 1905 may be performed by a random access configuration manager as described with reference to FIGS. 11 through 14.

At 1910, the base station may transmit, to a second UE associated with a second protocol type, a third random access configuration. The operations of 1910 may be performed according to the methods described herein. In some examples, aspects of the operations of 1910 may be performed by a random access configuration manager as described with reference to FIGS. 11 through 14.

At 1915, the base station may transmit a set of SSBs. The operations of 1915 may be performed according to the methods described herein. In some examples, aspects of the operations of 1915 may be performed by a SSB manager as described with reference to FIGS. 11 through 14.

At 1920, the base station may receive, from the first UE, a first random access sequence and one or more repetitions of the first random access sequence associated with a first SSB of the set of SSBs over one or more (e.g., a first subset of) random access occasions of a first association period, the one or more random access occasions selected from a first set of random access occasions based on an index of the first synchronization signal block, where the first set of random access occasions may be based on the first random access configuration and the second random access configuration. The operations of 1920 may be performed according to the methods described herein. In some examples, aspects of the operations of 1920 may be performed by a random access sequence manager as described with reference to FIGS. 11 through 14.

At 1925, the base station may receive, from the second UE, a second random access sequence associated with the first SSB over a random access occasion (e.g., one or more of a second subset of random access occasions) of a second association period, the random access occasion (e.g., one or more of a second subset of random access occasions) selected from a second set of random access occasions based on an index of the first SSB, where the second set of random access occasions may be based on the third random access configuration. The operations of 1925 may be performed according to the methods described herein. In some examples, aspects of the operations of 1925 may be performed by a random access sequence manager as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code-division multiple access (CDMA), time-division multiple access (TDMA), frequency-division multiple access (FDMA), orthogonal frequency-division multiple access (OFDMA), single carrier frequency-division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    receiving, from a base station, a first random access configuration and a second random access configuration;
    receiving a synchronization signal block of a plurality of synchronization signal blocks transmitted by the base station;
    determining a first set of random access occasions within an association period based at least in part on the first random access configuration and the second random access configuration;
    mapping one or more indices of the plurality of synchronization signal blocks to one or more random access occasions of the first set of random access occasions within the association period; and
    transmitting, to the base station, a random access sequence and one or more repetitions of the random access sequence using the one or more random access occasions associated with the synchronization signal block for the association period,
    wherein the first random access configuration indicates a first configuration period and a first set of random access opportunities for the first configuration period,
    wherein the second random access configuration indicates a second configuration period and a second set of random access opportunities for the second configuration period, and
    wherein the first set of random access occasions are time-division multiplexed with a second set of random access occasions over different sets of nonoverlapping time-domain resources.

2. The method of claim 1, wherein mapping the one or more indices comprises sequentially mapping indices of the plurality of synchronization signal blocks to the first set of random access opportunities and the second set of random access opportunities.

3. The method of claim 1, wherein determining the first set of random access occasions comprises:
    determining the association period based at least in part on mapping an integer multiple of the plurality of synchronization signal blocks to the first set of random access opportunities and the second set of random access opportunities.

4. The method of claim 1, wherein the association period is based at least in part on an integer number of a maximum value for the first configuration period or the second configuration period.

5. The method of claim 1, wherein mapping the one or more indices comprises independently mapping indices of the plurality of synchronization signal blocks to the first set of random access opportunities and the second set of random access opportunities.

6. The method of claim 1, wherein each of the plurality of synchronization signal blocks is associated with a different directional beam transmitted by the base station.

7. A method for wireless communication at a base station, comprising:

transmitting, to a first user equipment (UE) associated with a first protocol type, a first random access configuration and a second random access configuration;

transmitting a plurality of synchronization signal blocks;

mapping one or more indices of the plurality of synchronization signal blocks to a first set of random access occasions of a first association period, wherein the first set of random access occasions is based at least in part on the first random access configuration and the second random access configuration; and receiving, from the first UE, a first random access sequence and one or more repetitions of the first random access sequence associated with a first synchronization signal block of the plurality of synchronization signal blocks over one or more random access occasions of the first association period, wherein the first random access configuration indicates a first configuration period and a first set of random access opportunities for the first configuration period, wherein the second random access configuration indicates a second configuration period and a second set of random access opportunities for the second configuration period, and wherein the first set of random access occasions are time-division multiplexed with a second set of random access occasions over different sets of nonoverlapping time-domain resources.

8. The method of claim 7, further comprising:
transmitting, to a second UE associated with a second protocol type, a third random access configuration; and
receiving, from the second UE, a second random access sequence associated with the first synchronization signal block over a random access occasion of the second set of random access occasions of a second association period, wherein the second set of random access occasions is based at least in part on the third random access configuration,
wherein the first protocol type is associated with a first set of UE capabilities and the second protocol type is associated with a second set of UE capabilities.

9. The method of claim 8, wherein at least one random access occasion of the second set of random access occasions overlaps in the time-domain with the first set of random access occasions.

10. The method of claim 8, wherein the one or more random access occasions of the first set of random access occasions are frequency-division multiplexed with the random access occasion of the second set of random access occasions.

11. The method of claim 7, further comprising:
determining the first association period based at least in part on mapping an integer multiple of the plurality of synchronization signal blocks to the first set of random access opportunities and the second set of random access opportunities.

12. The method of claim 7, wherein the first association period is based at least in part on an integer number of a maximum value for the first configuration period or the second configuration period.

13. The method of claim 7, wherein mapping the one or more indices comprises sequentially mapping indices of the plurality of synchronization signal blocks to the first set of random access opportunities and the second set of random access opportunities.

14. The method of claim 7, wherein mapping the one or more indices comprises independently mapping indices of the plurality of synchronization signal blocks to the first set of random access opportunities and the second set of random access opportunities.

15. The method of claim 7, wherein transmitting the plurality of synchronization signal blocks comprises transmitting each of the plurality of synchronization signal blocks with a different directional beam.

16. An apparatus configured for wireless communication at a user equipment (UE), comprising:
memory comprising executable instructions; and
one or more processors configured to execute the instructions and cause the apparatus to:
receive, from a base station, a first random access configuration and a second random access configuration;
receive a synchronization signal block of a plurality of synchronization signal blocks transmitted by the base station;
determine a first set of random access occasions within an association period based at least in part on the first random access configuration and the second random access configuration;
map one or more indices of the plurality of synchronization signal blocks to one or more random access occasions of the first set of random access occasions within the association period; and
transmit, to the base station, a random access sequence and one or more repetitions of the random access sequence using the one or more random access occasions associated with the synchronization signal block for the association period,
wherein the first random access configuration indicates a first configuration period and a first set of random access opportunities for the first configuration period,
wherein the second random access configuration indicates a second configuration period and a second set of random access opportunities for the second configuration period, and
wherein the first set of random access occasions are time-division multiplexed with a second set of random access occasions over different sets of nonoverlapping time-domain resources.

17. The apparatus of claim 16, wherein to map the one or more indices, the one or more processors are configured to execute the instructions and cause the apparatus to sequentially map indices of the plurality of synchronization signal blocks to the first set of random access opportunities and the second set of random access opportunities.

18. The apparatus of claim 16, wherein to determine the first set of random access occasions, the one or more processors are configured to execute the instructions and cause the apparatus to:
determine the association period based at least in part on a mapping of an integer multiple of the plurality of synchronization signal blocks to the first set of random access opportunities and the second set of random access opportunities.

19. The apparatus of claim 16, wherein the association period is based at least in part on an integer number of a maximum value for the first configuration period or the second configuration period.

20. The apparatus of claim 16, wherein to map the one or more indices, the one or more processors are configured to execute the instructions and cause the apparatus to independently map indices of the plurality of synchronization signal blocks to the first set of random access opportunities and the second set of random access opportunities.

21. The apparatus of claim 16, wherein each of the plurality of synchronization signal blocks is associated with a different directional beam transmitted by the base station.

22. An apparatus configured for wireless communication at a base station, comprising:
   memory comprising executable instructions; and
   one or more processors configured to execute the instructions and cause the apparatus to:
   transmit, to a first user equipment (UE) associated with a first protocol type, a first random access configuration and a second random access configuration;
   transmit a plurality of synchronization signal blocks;
   map one or more indices of the plurality of synchronization signal blocks to a first set of random access occasions of a first association period, wherein the first set of random access occasions is based at least in part on the first random access configuration and the second random access configuration; and
   receive, from the first UE, a first random access sequence and one or more repetitions of the first random access sequence associated with a first synchronization signal block of the plurality of synchronization signal blocks over one or more random access occasions of the first association period,
   wherein the first random access configuration indicates a first configuration period and a first set of random access opportunities for the first configuration period,
   wherein the second random access configuration indicates a second configuration period and a second set of random access opportunities for the second configuration period, and
   wherein the first set of random access occasions are time-division multiplexed with a second set of random access occasions over different sets of nonoverlapping time-domain resources.

23. The apparatus of claim 22, wherein the one or more processors are configured to execute the instructions and cause the apparatus to:
   transmit, to a second UE associated with a second protocol type, a third random access configuration; and
   receive, from the second UE, a second random access sequence associated with the first synchronization signal block over a random access occasion of the second set of random access occasions of a second association period, wherein the second set of random access occasions is based at least in part on the third random access configuration,
   wherein the first protocol type is associated with a first set of UE capabilities and the second protocol type is associated with a second set of UE capabilities.

24. The apparatus of claim 23, wherein at least one random access occasion of the second set of random access occasions overlaps in the time-domain with the first set of random access occasions.

25. The apparatus of claim 23, wherein the one or more random access occasions of the first set of random access occasions are frequency-division multiplexed with the random access occasion of the second set of random access occasions.

26. The apparatus of claim 22, wherein the one or more processors are configured to execute the instructions and cause the apparatus to:
   determine the first association period based at least in part on a mapping of an integer multiple of the plurality of synchronization signal blocks to the first set of random access opportunities and the second set of random access opportunities.

27. The apparatus of claim 22, wherein the first association period is based at least in part on an integer number of a maximum value for the first configuration period or the second configuration period.

28. The apparatus of claim 22, wherein to map the one or more indices, the one or more processors are configured to execute the instructions and cause the apparatus to sequentially map indices of the plurality of synchronization signal blocks to the first set of random access opportunities and the second set of random access opportunities.

29. The apparatus of claim 22, wherein to map the one or more indices, the one or more processors are configured to execute the instructions and cause the apparatus to independently map indices of the plurality of synchronization signal blocks to the first set of random access opportunities and the second set of random access opportunities.

30. The apparatus of claim 22, wherein to transmit the plurality of synchronization signal blocks, the one or more processors are configured to execute the instructions and cause the apparatus to transmit each of the plurality of synchronization signal blocks with a different directional beam.

* * * * *